US008321299B2

(12) United States Patent
Smith

(10) Patent No.: US 8,321,299 B2
(45) Date of Patent: *Nov. 27, 2012

(54) METHOD, SYSTEM, AND COMPUTER READABLE MEDIUM FOR RULE-BASED MULTI-SELECTION GIFTING

(75) Inventor: Michael George Smith, Monterey, CA (US)

(73) Assignee: Shop MA, Inc., Miami, FL (US)

( * ) Notice: Subject to any disclaimer, the term of this patent is extended or adjusted under 35 U.S.C. 154(b) by 336 days.

This patent is subject to a terminal disclaimer.

(21) Appl. No.: 12/813,513

(22) Filed: Jun. 11, 2010

(65) Prior Publication Data

US 2010/0299228 A1 Nov. 25, 2010

Related U.S. Application Data

(63) Continuation of application No. 11/897,215, filed on Aug. 28, 2007, now Pat. No. 7,761,344.

(51) Int. Cl.
*G06Q 30/00* (2006.01)

(52) U.S. Cl. .................. 705/26.8; 705/26.1; 705/26.41; 705/26.61

(58) Field of Classification Search ......... 705/26.1–27.2
See application file for complete search history.

(56) References Cited

U.S. PATENT DOCUMENTS

| | | | |
|---|---|---|---|
| 5,754,981 A | 5/1998 | Veeneman et al. | |
| 6,138,106 A * | 10/2000 | Walker et al. ................. | 705/14.1 |
| 6,321,211 B1 | 11/2001 | Dodd | |
| 6,499,052 B1 | 12/2002 | Hoang et al. | |
| 6,629,079 B1 | 9/2003 | Spiegel et al. | |
| 6,665,577 B2 | 12/2003 | Onyshkevych et al. | |
| 6,999,941 B1 | 2/2006 | Agarwal | |
| 7,117,168 B2 | 10/2006 | Eaton | |
| 7,130,817 B2 | 10/2006 | Karas et al. | |
| 7,149,710 B1 | 12/2006 | Edmark | |
| 7,197,475 B1 | 3/2007 | Lorenzen et al. | |
| 7,418,407 B2 | 8/2008 | Giannini | |
| 7,761,344 B2 * | 7/2010 | Smith .......................... | 705/26.2 |
| 2002/0026377 A1 | 2/2002 | Takahashi | |
| 2002/0085025 A1 | 7/2002 | Busis et al. | |

(Continued)

OTHER PUBLICATIONS www.shop.com Jan. 11, 2006 to May 17, 2006. [recovered from www.Archive.org].*
Wish Solutions Partners with Commission Junction to provide Wish List Technology to E-Tailers; PlanetOutdoors to Offer Wish List Technology. Business Wire, p. 0343, Jul. 13, 2000.

(Continued)

*Primary Examiner* — William Allen
(74) *Attorney, Agent, or Firm* — Sequel Group LLC

(57) ABSTRACT

A method for multi-selection gifting, including maintaining, by at least one of a plurality of computers, a gift database including records for multi-selection gifts, each record including a plurality of product identifiers for items of merchandise, and at least one selection rule governing selection of at least two of the items of merchandise, and interactively enabling, by at least one of the plurality of computers, a gift giver to generate a multi-selection gift for at least one gift recipient, including presenting, to the gift giver, a group of selection rules for selection by the gift giver, the group including allowing a gift recipient to select up to a specified total number of items of merchandise in the multi-selection gift, allowing the gift recipient to select items of merchandise in the multi-selection gift up to a specified total cost, and allowing the gift recipient to select items of merchandise in the multi-selection gift up to a specified total measure. A system and a computer-readable storage medium are also described and claimed.

19 Claims, 16 Drawing Sheets

U.S. PATENT DOCUMENTS

| | | |
|---|---|---|
| 2002/0138170 A1 | 9/2002 | Onyshkevych et al. |
| 2003/0074265 A1 | 4/2003 | Oshima |
| 2003/0171997 A1* | 9/2003 | Eaton .............................. 705/26 |
| 2003/0177054 A1 | 9/2003 | Reinbold et al. |
| 2005/0033650 A1 | 2/2005 | Robertson |
| 2005/0044005 A1 | 2/2005 | Giannini |
| 2005/0102496 A1 | 5/2005 | Veeneman |
| 2006/0178969 A1* | 8/2006 | Caillens et al. ................. 705/35 |
| 2008/0046331 A1 | 2/2008 | Rand |
| 2008/0243630 A1 | 10/2008 | Farney |
| 2009/0063296 A1 | 3/2009 | Cesmedziev |

OTHER PUBLICATIONS

PersonalGift, Gund Announce Launch of TeddyMail E-Commerce Site with Recipient's Choice Gift Feature, http://www.highbeam.com/doc/1G1-53339736.html.

eGifts—Send a Gift in Seconds, http://www.shop.com/cc.class/cc?main=cnn_egift_purchase&ccsyn=260.

eGifts FAQs (Frequently Asked Questions), http://www.shop.com/about-egifts-a.shtml.

How eGifts Work, http://www.shop.com/cc.class/cc?main=egifts_exapleind&ccsyn=260.

\* cited by examiner

| Current Gift Choices (4) Recipient can select up to ⦿ [2] Items  ○ [$300] Limit | | ◁ Send this eGift |
|---|---|---|
| ☐ eGift Item  (Save for Later)  (Delete checked items)  (Group checked items)  (Ungroup checked items) | | |
| ☐ 🧥 | Men's Synrgy Bedford Sport Coat<br>from Casual Male | Quantity  180 —[1]<br>Price  $125.00<br>Shipping  $12.95<br>Sub-total  $137.95 |
| 👖 | Polo Golf by Ralph Lauren Pleated Navy Pants<br>from SmartBargains.com<br>*I think you'd look great in the jacket and pants. Pick one of the shirts to complete your gift!*  185<br>Details    Add Comment    190 | Quantity  180 —[1]<br>Price  $49.99<br>Shipping  $9.95<br>Sub-total  $59.94<br>Total  $197.89<br>☐ Allow recipient to UNgroup |
| ☐ 👕 | Forzieri Dark Green Plaid Button Down Cotton Dress Shirt<br>from FORZIERI<br>Details    Add Comment    Move to Top | Quantity  180 —[1]<br>Price  $119.00<br>Shipping  $0.00<br>Total  $119.00 |
| ☐ 👕 | David Chu Italian Cotton Sport Shirt-Striped Long Sleeve (for Men)<br>from Sierra Trading Post<br>Details    Add Comment    Move to Top | Quantity  180 —[1]<br>Price  $79.95<br>Shipping  ☐ Calculate<br>Total  $89.95 - $119.00 |
| ☐ SHOP•COM | Multi-merchant Gift Certificate<br>Details    Add Comment    Move to Top | ⦿ Fixed Value  [$100]<br>○ Balance after other choices |
| Prices will not be shown to the recipient<br>See explanation of charges | | Item Price: $49.99-$125.00<br>Shopping:  ☐ Calculate<br>Order Total: $59.94-$316.89 |

FIG. 1

Figure 3:
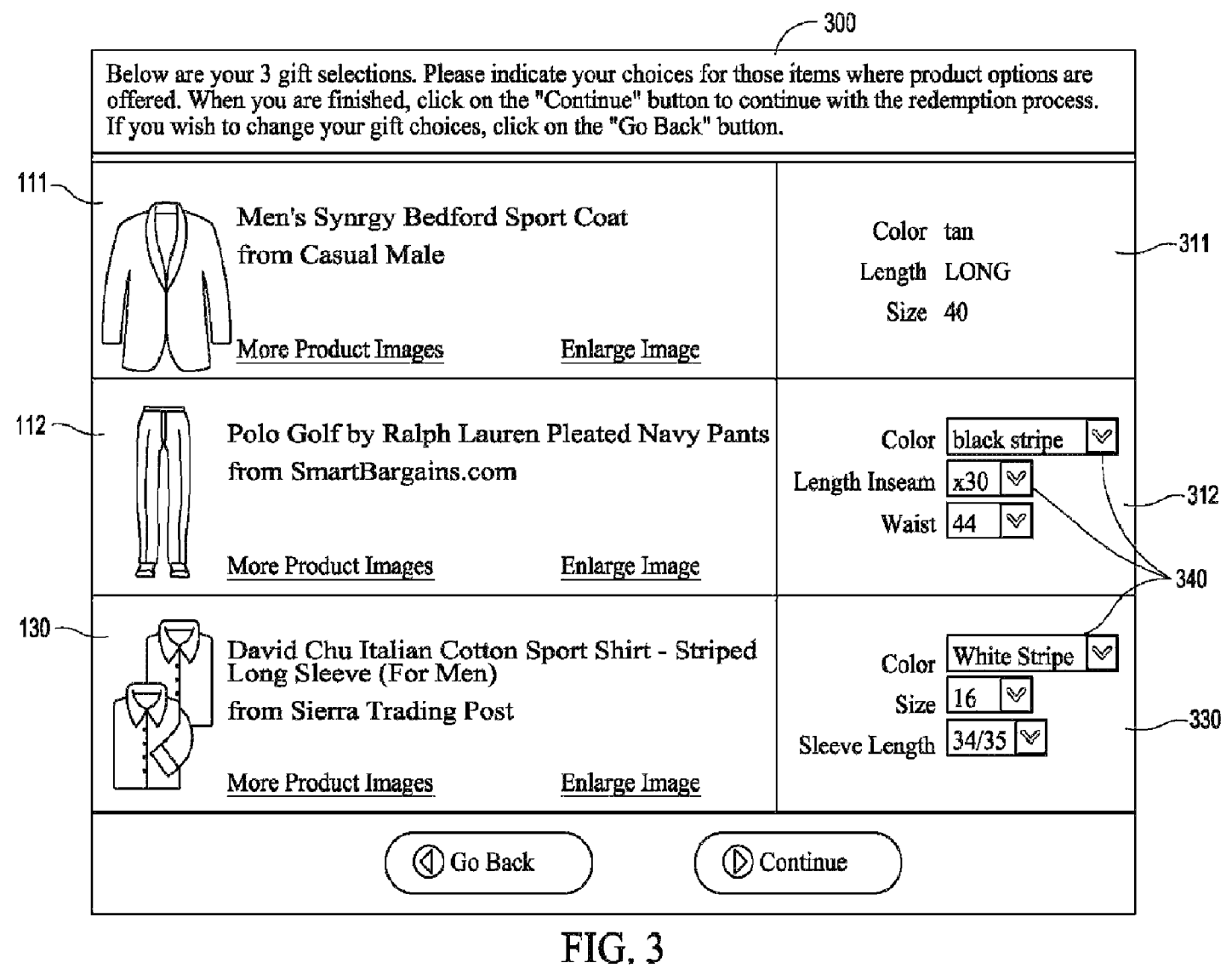

Below are your 3 gift selections. Please indicate your choices for those items where product options are offered. When you are finished, click on the "Continue" button to continue with the redemption process. If you wish to change your gift choices, click on the "Go Back" button.

| | |
|---|---|
| Men's Synrgy Bedford Sport Coat from Casual Male<br><br>More Product Images    Enlarge Image | Color   tan<br>Length   LONG<br>Size   40 |
| Polo Golf by Ralph Lauren Pleated Navy Pants from SmartBargains.com<br><br>More Product Images    Enlarge Image | Color   [black stripe ▼]<br>Length Inseam [x30 ▼]<br>Waist [44 ▼] |
| David Chu Italian Cotton Sport Shirt - Striped Long Sleeve (For Men) from Sierra Trading Post<br><br>More Product Images    Enlarge Image | Color   [White Stripe ▼]<br>Size   [16 ▼]<br>Sleeve Length [34/35 ▼] |

[Go Back]    [Continue]

METHOD, SYSTEM, AND COMPUTER READABLE MEDIUM FOR RULE-BASED MULTI-SELECTION GIFTING

PRIORITY REFERENCE TO RELATED APPLICATIONS

This application is a continuation of U.S. application Ser. No. 11/897,215, entitled ELECTRONIC COMMERCE RULE-BASED MULTI-SELECTION GIFTING filed on Aug. 28, 2007 now U.S. Pat. No. 7,761,344 by inventor Michael George Smith.

FIELD OF THE INVENTION

The present invention relates to electronic on-line commerce.

BACKGROUND OF THE INVENTION

E-commerce technology enables consumers to purchase items of merchandise on-line, from web sites that act as virtual stores. Pioneers of e-commerce include Amazon.com, Inc. of Seattle, Wash., eBay Inc. of San Jose, Calif., and Shop.com of Monterey, Calif. E-commerce technology combines on-line catalogue ingest, browsing and search, inventory management, purchase and payment transactions, automated payment processing, and other components within a comprehensive e-commerce server.

The growth of the Internet as a medium for consumer marketing has led to terrific growth of product and service offerings. One direction of this growth has been in the expansion from single vendor e-commerce sites that act as virtual stores, to multi-vendor e-commerce sites that act as virtual shopping malls. The virtual shopping mall provides a single integrated web site where consumers can purchase goods and services from a wide diversity of merchants. Multi-vendor e-commerce web sites are able to incorporate features of single vendor sites, and have the potential of offering features beyond those offered on single vendor sites.

A growing feature of single vendor and multi-vendor web sites, which has proven to be a substantial source of revenue, is the commerce of gift giving. The expansion of web sites from single vendor to multi-vendor provides opportunities for extending traditional models of gift giving that have not yet been realized. In addition, traditional e-commerce gifts are limited to unilateral actions taken by a gift giver that do not necessarily take into consideration tastes, preferences or physical characteristics of a gift recipient.

There is thus a need for designs and implementations of gift-giving technologies, which allow gift recipients to have flexibility in selecting items that are meaningful, useful and enjoyable to them, while still adhering to constraints, such as cost, prescribed by the gift giver.

SUMMARY OF THE DESCRIPTION

The present invention concerns e-commerce, and more specifically single vendor and multi-vendor on-line shopping malls. Aspects of the present invention provide systems and methods for single vendor and multi-vendor gift giving, which enable a gift giver to generate a custom gift, including a plurality of items of merchandise from a plurality of merchants, and which enable a gift recipient to select one or more of the gift items in accordance with rules prescribed by the gift giver.

The present invention enables a gift giver to designate a plurality of items of merchandise, in the form of goods and services from multiple merchant catalogues, from which a gift recipient may choose one or more goods and services. The gift giver may prescribe constraints on the items that the gift recipient may select, such as a limit on the total number of items that recipient may select, or a limit on the total cost of the items that the recipient may select. Together, the plurality of designated items of merchandise and the prescribed constraints define a "multi-selection gift".

The present invention guides the gift recipient in selecting his gift items, so that the recipient's selections are in compliance with the gift giver's constraints. The present invention also guides the gift recipient in selecting applicable options associated with the gift items he selects, such as size, color, and monogramming. The present invention enables the on-line shopping mall system to issue appropriate purchase orders to the various merchants in accordance with the items that the recipient selects, and to issue an appropriate invoice to the gift giver.

An advantage provided by the present invention is that the gift giver is not billed for purchase of his gift until the gift is redeemed by the gift recipient. In distinction, prior art gifting technologies generally bill the gift giver at the time of purchase of his gift, which has several drawbacks. One such drawback is that in many instances gifts are not redeemed, or are only partially redeemed, and yet the gift giver was billed in full. In some cases mechanisms exist for gift givers to request refunds for un-redeemed or partially-redeemed gifts, but this requires effort on the part of the gift giver, which in turn is a disincentive for purchasing gifts. For example, a gift giver purchases a $300 gift certificate for a gift recipient, and is billed $300 at the time of purchase. However, the gift recipient only redeems $250 worth of gifts. The $50 balance is held in a gift recipient account for application towards future purchases, but may never be used by the gift recipient, or may be used reluctantly by the gift recipient for purchases he never intended to make. Using the present invention, the gift recipient would be billed only $250, at the time the gift recipient redeems the certificate.

The present invention includes a database for storing multi-selection gifts, a gift generator web tool for enabling a gift giver to generate a custom multi-selection gift, a notification mechanism for notifying a gift recipient of his multi-selection gift and for providing him with an identifier of the gift, and a gift redeemer web tool for enabling the gift recipient to redeem his multi-selection gift in accordance with the constraints set by the gift giver.

There is thus provided in accordance with an embodiment of the present invention a method for multi-selection gifting, including maintaining a merchandise database including records for merchandise for a plurality of merchants, each record including a stock keeping unit (SKU) for an item of merchandise, a description of the item, a price of the item, and the merchant for the item, maintaining a gift database including records for multi-selection gifts, each record including at least one gift recipient, a plurality of SKU's for items of merchandise, and at least one selection rule for selecting at least one of the items of merchandise, interactively enabling a gift giver to generate a multi-selection gift for a gift recipient, interactively guiding the gift recipient to select at least one of the items of merchandise in the multi-selection gift in accordance with the gift's at least one selection rule, aggregating the at least one item selected by the gift recipient according to merchant, issuing purchase orders to each merchant in accordance with the aggregated selected items corresponding to such merchant, and billing the gift giver according to the at least one item of merchandise selected by the gift recipient.

There is additionally provided in accordance with an embodiment of the present invention a system for multi-selection gifting, including a memory for storing a merchandise database including records for merchandise for a plurality of merchants, each record including a stock keeping unit (SKU) for an item of merchandise, a description of the item, a price of the item, and the merchant for the item, and a gift database including records for multi-selection gifts, each record including at least one gift recipient, a plurality of SKU's for items of merchandise, and at least one selection rule for selecting at least one of the items of merchandise, a gift generator for enabling a gift giver to generate a multi-selection gift for a gift recipient, a gift redeemer for enabling the gift recipient to select at least one of the items of merchandise in the multi-selection gift in accordance with the gift's at least one selection rule, a purchase order manager for aggregating the at least one item selected by the gift recipient according to merchant, and for issuing purchase orders to each merchant in accordance with the aggregated selected items corresponding to such merchant, and an invoice manager for billing the gift giver according to the at least one item of merchandise selected by the gift recipient.

There is moreover provided in accordance with an embodiment of the present invention a computer-readable storage medium storing program code for causing a computing device to maintain a merchandise database including records for merchandise for a plurality of merchants, each record including a stock keeping unit (SKU) for an item of merchandise, a description of the item, a price of the item, and the merchant for the item, to maintain a gift database including records for multi-selection gifts, each record including at least one gift recipient, a plurality of SKU's for items of merchandise, and at least one selection rule for selecting at least one of the items of merchandise, to interactively enable a gift giver to generate a multi-selection gift for a gift recipient, to interactively guide the gift recipient to select at least one of the items of merchandise in the multi-selection gift in accordance with the gift's at least one selection rule, to aggregate the at least one item selected by the gift recipient according to merchant, to issue purchase orders to each merchant in accordance with the aggregated selected items corresponding to such merchant, and to bill the gift giver according to the at least one item of merchandise selected by the gift recipient.

There is further provided in accordance with an embodiment of the present invention a method for multi-selection gifting, including identifying a multi-selection gift, the multi-selection gift including at least one gift recipient, a plurality of gift choices, each gift choice being either an individual item of merchandise or a group of items of merchandise, and a designated maximum number of gift choices that may be selected, and interactively guiding the gift recipient in selecting one or more of the plurality of gift choices, including maintaining a selection counter that informs that gift recipient as to whether the gift recipient's selection of gift choices have reached the designated maximum number, and ensuring that the gift recipient's selection of gift choices does not exceed the designated maximum number of gift choices.

There is yet further provided in accordance with an embodiment of the present invention a method for multi-selection gifting, including identifying a multi-selection gift, the multi-selection gift including at least one gift recipient, a plurality of gift choices, each gift choice being either an individual item of merchandise or a group of items of merchandise, and a designated maximum cost of gift choices that may be selected, and interactively guiding the gift recipient in selecting one or more of the plurality of gift choices, including maintaining a selection counter that informs that gift recipient as to whether the cost of the gift recipient's selection of gift choices has reached the designated maximum cost, and ensuring that the gift recipient's selection of gift choices does not exceed the designated maximum cost of gift choices.

There is additionally provided in accordance with an embodiment of the present invention a system for multi-selection gifting, including a memory for storing a multi-selection gift, the multi-selection gift including at least one gift recipient, a plurality of gift choices, each gift choice being either an individual item of merchandise or a group of items of merchandise, and a designated maximum number of gift choices that may be selected, and a user interface for interactively guiding the gift recipient in selecting one or more of the plurality of gift choices, by maintaining a selection counter that informs that gift recipient as to whether the gift recipient's selection of gift choices have reached the designated maximum number, and by ensuring that the gift recipient's selection of gift choices does not exceed the designated maximum number of gift choices.

There is moreover provided in accordance with an embodiment of the present invention a system for multi-selection gifting, including a memory for storing a multi-selection gift, the multi-selection gift including at least one gift recipient, a plurality of gift choices, each gift choice being either an individual item of merchandise or a group of items of merchandise, and a designated maximum cost of gift choices that may be selected, and a user interface for interactively guiding the gift recipient in selecting one or more of the plurality of gift choices, by maintaining a selection counter that informs that gift recipient as to whether the cost of the gift recipient's selection of gift choices has reached the designated maximum cost, and by ensuring that the gift recipient's selection of gift choices does not exceed the designated maximum cost of gift choices.

There is further provided in accordance with an embodiment of the present invention a computer-readable storage medium storing program code for causing a computing device to identify a multi-selection gift, the multi-selection gift including at least one gift recipient, a plurality of gift choices, each gift choice being either an individual item of merchandise or a group of items of merchandise, and a designated maximum number of gift choices that may be selected, and to interactively guide the gift recipient in selecting one or more of the plurality of gift choices, by maintaining a selection counter that informs that gift recipient as to whether the gift recipient's selection of gift choices have reached the designated maximum number, and ensuring that the gift recipient's selection of gift choices does not exceed the designated maximum number of gift choices.

There is yet further provided in accordance with an embodiment of the present invention a computer-readable storage medium storing program code for causing a computing device to identify a multi-selection gift, the multi-selection gift including at least one gift recipient, a plurality of gift choices, each gift choice being either an individual item of merchandise or a group of items of merchandise, and a designated maximum cost of gift choices that may be selected, and to interactively guide the gift recipient in selecting one or more of the plurality of gift choices, by maintaining a selection counter that informs that gift recipient as to whether the cost of the gift recipient's selection of gift choices has reached the designated maximum cost, and ensuring that the gift recipient's selection of gift choices does not exceed the designated maximum cost of gift choices.

There is additionally provided in accordance with an embodiment of the present invention a method for multi-selection gifting, including identifying a multi-selection gift, the multi-selection gift including a gift recipient, a plurality of gift choices, each gift choice being either an individual item of merchandise or a group of items of merchandise, and a designated maximum cost of gift choices that may be selected, and interactively guiding the gift recipient in selecting one or more of the plurality of gift choices without exceeding the designated maximum cost, including un-grouping a group of items in a gift choice into a plurality of individual items, and re-grouping a plurality of items into a group, if the plurality of items were originally part of the same group in the multi-selection gift.

There is moreover provided in accordance with an embodiment of the present invention a system for multi-selection gifting, including a memory for storing a multi-selection gift, the multi-selection gift including a gift recipient, a plurality of gift choices, each gift choice being either an individual item of merchandise or a group of items of merchandise, and a designated maximum cost of gift choices that may be selected, and a user interface for interactively guiding the gift recipient in selecting one or more of the plurality of gift choices without exceeding the designated maximum cost, by un-grouping a group of items in a gift choice into a plurality of individual items, and by re-grouping a plurality of items into a group, if the plurality of items were originally part of the same group in the multi-selection gift.

There is further provided in accordance with an embodiment of the present invention a computer-readable storage medium storing program code for causing a computing device to identify a multi-selection gift, the multi-selection gift including a gift recipient, a plurality of gift choices, each gift choice being either an individual item of merchandise or a group of items of merchandise, and a designated maximum cost of gift choices that may be selected, and to interactively guiding the gift recipient in selecting one or more of the plurality of gift choices without exceeding the designated maximum cost, by un-grouping a group of items in a gift choice into a plurality of individual items, and by re-grouping a plurality of items into a group, if the plurality of items were originally part of the same group in the multi-selection gift.

There is yet further provided in accordance with an embodiment of the present invention a method for multi-selection gifting, including identifying a multi-selection gift, the multi-selection gift including a gift giver, a gift recipient, a plurality of items of merchandise, and at least one selection rule for selecting at least one of the items of merchandise, interactively guiding the gift recipient in selecting at least one item of merchandise in accordance with the at least one selection rule, and billing the gift giver subsequent to the interactively guiding, according to the at least one item of merchandise selected by the gift recipient.

There is additionally provided in accordance with an embodiment of the present invention a system for multi-selection gifting, including a memory for storing a multi-selection gift, the multi-selection gift including a gift giver, a gift recipient, a plurality of items of merchandise, and at least one selection rule for selecting at least one of the items of merchandise, a user interface for interactively guiding the gift recipient in selecting at least one item of merchandise in accordance with the at least one selection rule, and an invoice manager for billing the gift giver according to the at least one item of merchandise selected by the gift recipient.

There is moreover provided in accordance with an embodiment of the present invention a computer-readable storage medium storing program code for causing a computing device to identify a multi-selection gift, the multi-selection gift including a gift giver, a gift recipient, a plurality of items of merchandise, and at least one selection rule for selecting at least one of the items of merchandise, to interactively guide the gift recipient in selecting at least one item of merchandise in accordance with the at least one selection rule, and to bill the gift giver according to the at least one item of merchandise selected by the gift recipient.

There is further provided in accordance with an embodiment of the present invention a method for multi-selection gifting, including presenting a gift recipient with a set $C=\{c_1, c_2, \ldots, c_n\}$ of gift choices, $n>1$, together with at least one constraint of the form $f(S) \leq x$, where $f$ is a real-valued function of subsets $S \subset C$, and interactively guiding the recipient in selecting a subset $S \subset C$ that satisfies that at least one constraint, wherein the at least one function $f$ is monotonically increasing in the sense that $f(S_1) \leq f(S_2)$ whenever $S_1 \subset S_2$.

There is yet further provided in accordance with an embodiment of the present invention a system for multi-selection gifting, including a memory for storing a set $C=\{c_1, c_2, \ldots, c_n\}$ of gift choices, $n>1$, together with at least one constraint of the form $f(S) \leq x$, where $f$ is a real-valued function of subsets $S \subset C$; and a user interface for interactively guiding a gift recipient in selecting a subset $S \subset C$ that satisfies that at least one constraint, wherein the at least one function $f$ is monotonically increasing in the sense that $f(S_1) \leq f(S_2)$ whenever $S_1 \subset S_2$.

There is additionally provided in accordance with an embodiment of the present invention a computer-readable storage medium storing program code for causing a computing device to present a gift recipient with a set $C=\{c_1, c_2, \ldots, c_n\}$ of gift choices, $n>1$, together with at least one constraint of the form $f(S) \leq x$, where $f$ is a real-valued function of subsets $S \subset C$; and to interactively guide the recipient in selecting a subset $S \subset C$ that satisfies that at least one constraint, wherein the at least one function $f$ is monotonically increasing in the sense that $f(S_1) \leq f(S_2)$ whenever $S_1 \subset S_2$.

There is moreover provided in accordance with an embodiment of the present invention a method for gifting, including interactively enabling a gift giver to generate an electronic gift for a gift recipient, interactively guiding the gift recipient to redeem the gift in one of several ways of redemption, and billing the gift giver according to the gift recipient's way of redemption of the gift, after the interactively guiding.

There is further provided in accordance with an embodiment of the present invention a system for gifting, including a gift generator for enabling a gift giver to generate an electronic gift for a gift recipient, a gift redeemer for enabling the gift recipient to redeem the gift in one of several ways of redemption, and an invoice manager for billing the gift giver according to the gift recipient's way of redemption of the gift.

There is yet further provided in accordance with an embodiment of the present invention a computer-readable storage medium storing program code for causing a computing device to interactively enable an electronic gift giver to generate a gift for a gift recipient, to interactively guide the gift recipient to redeem the gift in one of several ways of redemption, and to bill the gift giver according to the gift recipient's way of redemption of the gift.

BRIEF DESCRIPTION OF THE DRAWINGS

The present invention will be more fully understood and appreciated from the following detailed description, taken in conjunction with the drawings in which:

FIG. 1 is an illustration of a user interface for generating a multi-selection gift, in accordance with an embodiment of the present invention;

FIG. 3 is an illustration of a user interface for specifying product options for a multi-selection gift, in accordance with an embodiment of the present invention;

DETAILED DESCRIPTION

Figure 2A:
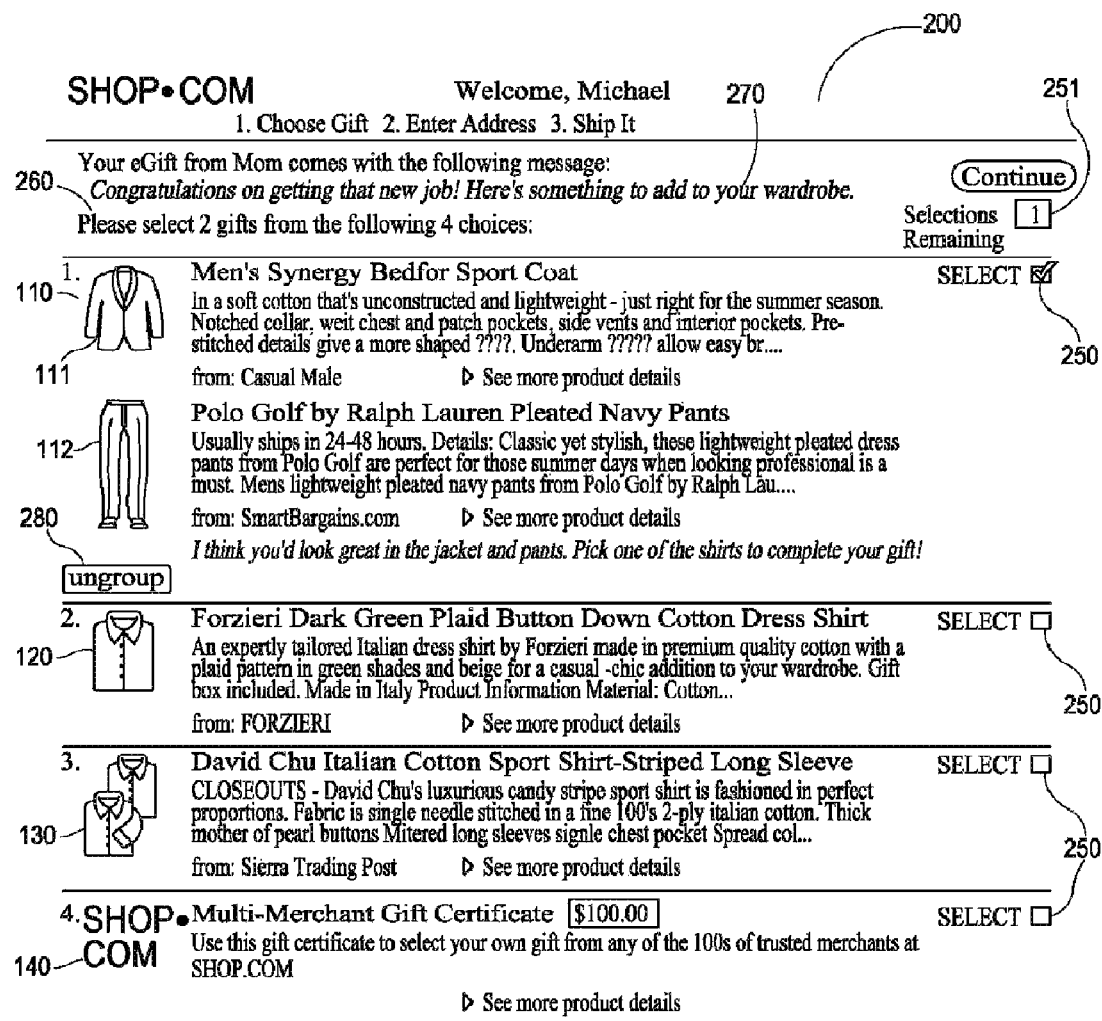
FIGS. 2A and 2B are illustrations of user interfaces for redeeming a multi-selection gift, in accordance with an embodiment of the present invention.

Aspects of the present invention concern inter alia a multi-selection gift, which provides the gift recipient with a list of gift choices to select and rules governing the permitted selections. Each gift choice may be either a single product or service, or a group of multiple products or services. The rules governing the permitted selection may designate a constraint such as the maximum number of gift choices that may be selected, or the maximum cost of gift choices that may be selected, or a gaming constraint such as a winning selection set or selection order, or such other constraint. The gift recipient thus has flexibility in selecting his gift choices, subject to constraints set by the gift giver.

Aspects of the present invention concern inter alia methods and systems for guiding a gift giver in generating a multi-selection gift, and methods and systems for guiding a gift recipient in redeeming his multi-selection gift.

In this regard, reference is now made to FIG. 1, which is an illustration of a user interface for generating a multi-selection gift, in accordance with an embodiment of the present invention. Shown in FIG. 1 is a web page 100 displaying a multi-selection gift having a list of four gift choices, as follows.

1. The first gift choice 110 is a group of two items; namely, a sport coat 111 and matching pants 112.
2. The second gift choice 120 is a dress shirt.
3. The third gift choice 130 is a sport shirt.
4. The fourth gift choice 140 is a $100 gift certificate.

It is noted that each of the items in the four gift choices is manufactured by a different merchant, as indicated in the item descriptions in FIG. 1. As shown near the top of web page 100, the gift giver has added a constraint 150 that the recipient may select up to two of the four gift choices. Alternatively, the gift giver may add a constraint 160 that the total cost of the gifts selected by the recipient does not exceed a designated amount, such as $300.

Items may be grouped together into a single gift choice, as in gift choice 110 by checking the desired items and clicking on control 171. Grouped items may be ungrouped by clicking on control 172. Thus it will be appreciated by those skilled in the art that groups may be flexibly generated at will. In addition, groups may be nested as groups and sub-groups.

A gift giver may include multiple quantities of an item in a multi-selection gift, as indicated by boxes 180. In turn, the gift recipient may select multiple units of the item, from one item up to the quantity set by the gift giver.

Messages, such as message 185, may be added to the multi-selection gift. Additional features of the user interface illustrated in FIG. 1 are described hereinbelow.

In accordance with an embodiment of the present invention, a multi-selection gift may be sent to multiple gift recipients. The multiple recipients may be separately addressed, or may be part of a list. Such list may be inter alia an e-mail list, or an organization, or a list of people with the same birthdays or close-together birthdays.

Figure 2B:
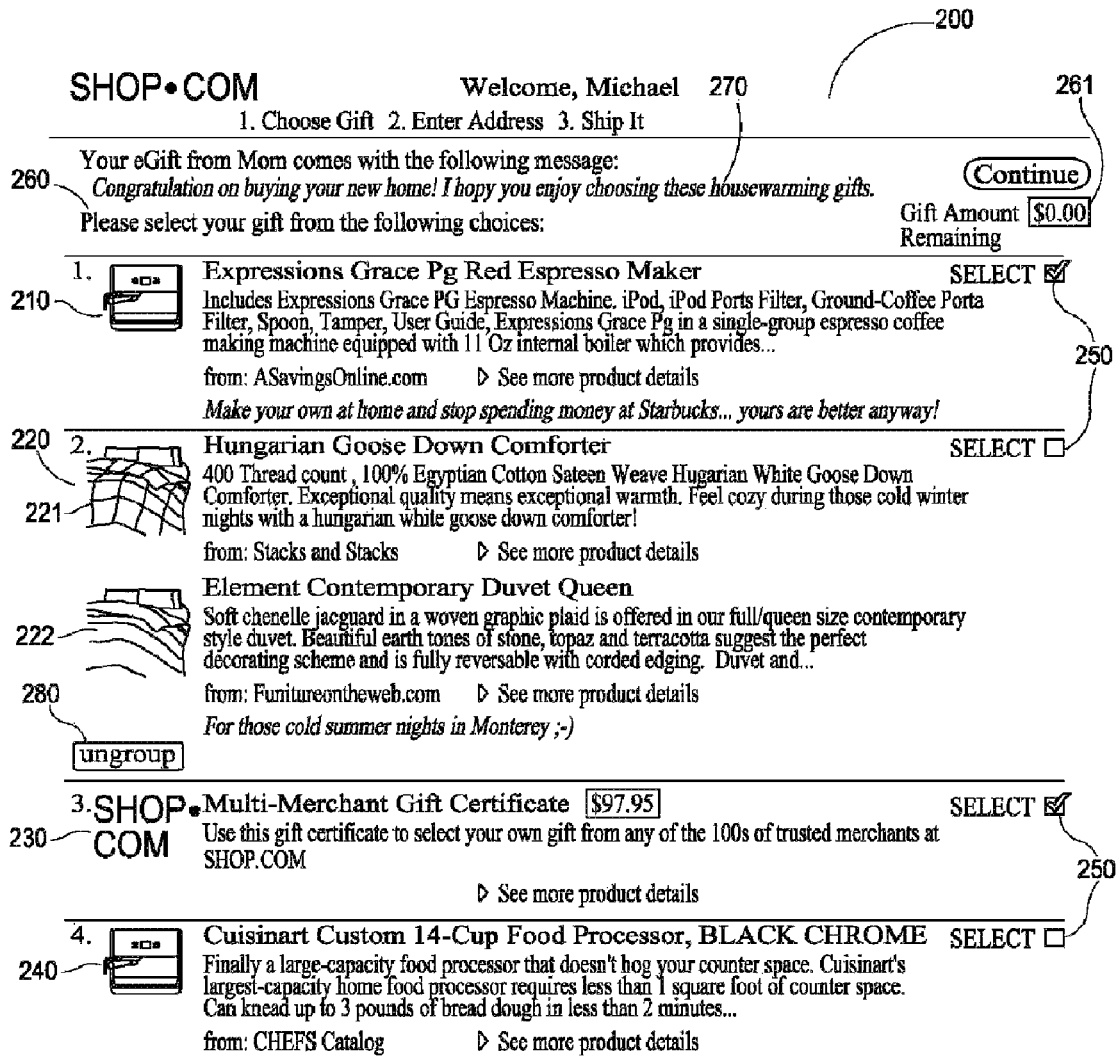

Reference is now made to FIGS. 2A and 2B, which are illustrations of user interfaces for redeeming a multi-selection gift, in accordance with an embodiment of the present invention. FIG. 2A corresponds to the multi-selection gift illustrated in FIG. 1, with a constraint of selecting two of the four gift choices. FIG. 2B corresponds to a similar multi-selection gift, with a constraint on total cost of the gift choice selections.

Shown in FIG. 2A is a web page 200 displaying a multi-selection gift that was sent from Mom to Michael on the occasion of starting a new job. The multi-selection gift includes the four gift choices shown in FIG. 1. Each gift choice may be selected by clicking on a select box 250 corresponding to the gift choice, and a selected gift choice may be un-selected by clicking again on its select box 250. By default, initially none of the gift choices are selected. As shown in FIG. 2A, the gift recipient has currently made one gift selection; namely, gift group 110 with the sport coat 111 and the pants 112.

The multi-selection gift in FIG. 2A has a constraint on the number of gift choices that may be selected by the gift recipient, corresponding to constraint 150 from FIG. 1. A counter 251 shows the number of remaining selections. As shown in FIG. 2A, counter 251 indicates that currently one selection remains. Counter 251 is used to guide the gift recipient in making gift selections that are within the constraint set by the gift giver.

The multi-selection gift includes a message 270 from the gift giver.

Items 111 and 112 that are grouped into a single gift choice may be un-grouped by clicking on an un-group box 280. The recipient has the ability to re-group items, but he can only do so if the items being re-grouped were originally grouped together. Thus the recipient can re-group all of an original group of items or a subset thereof, but cannot generate new groupings.

Shown in FIG. 2B is a similar web page 200 displaying a multi-selection gift that was sent from Mom to Michael on the occasion of buying a new home. The multi-selection gift includes four gift choices, as follows:
1. The first gift choice 210 is a coffee maker.
2. The second gift choice 220 is a group of two items; namely, a comforter 221 and a duvet 222.
3. The third gift choice 230 is an auto-generated gift certificate.
4. The fourth gift choice 240 is a food processor.

Each gift choice may be selected by clicking on a select box 250 corresponding to the gift choice, and a selected gift choice may be un-selected by clicking again on its select box 250. By default, initially none of the gift choices are selected. As shown in FIG. 2B, the gift recipient has currently selected gift choices 210 and 230.

The multi-selection gift in FIG. 2B has a constraint on the total cost of the gift choices that may be selected, as set by the gift giver using a constraint such as constraint 160 from FIG. 1. Gift certificate 230 is automatically generated in the amount of the unused balance. Thus, as shown in FIG. 2B, after selecting gift choice 210, the unused balance of the multi-selection gift of $97.95 is converted into gift certificate 230.

A counter 261 shows the balance remaining with the gift recipient's current selections. Since the gift recipient has selected gift certificate 230 as a gift choice selection, any remaining balance is automatically converted into gift certificate 230, and thus counter 261 indicates that currently the balance remaining is $0.00. Had the gift recipient not selected gift certificate 230, then counter 261 would indicate a balance remaining of $97.95. Counter 261 is used to guide the gift recipient in making gift selections that are within the total cost constraint.

The multi-selection gift includes a message 270 from the gift giver. Items 221 and 222 that are grouped into a single gift choice may be un-grouped by clicking on an un-group box 280. The recipient has the ability to re-group items, but he can only do so if the items being re-grouped where originally grouped together. Thus the recipient can re-group all of an original group of items or a subset thereof, but cannot generate new groupings.

In alternative embodiments of the present invention, redemption of a multi-selection gift may be randomly or conditionally tied to a contest, a multi-selection gift may be more than one-time limited redeemable or more than one-time unlimited redeemable, or a multi-selection gift may be demo-only and not redeemable.

Reference is now made to FIG. 3, which is an illustration of a user interface for specifying product options for a multi-selection gift, in accordance with an embodiment of the present invention. FIG. 3 corresponds to the multi-selection gift in FIGS. 1 and 2A. Shown in FIG. 3 is a web page 300 enabling a gift recipient to specify product options for gift choices he has selected. As seen in FIG. 3, a gift recipient has selected two gift choices; namely gift choices 110 and 130 from FIG. 1. This is consistent with the gift giver's constraint 150 of selecting up to two gift choices. Gift choice 110 is a grouped choice including coat 111 and pants 112, and gift choice 130 is a sport shirt. The selected coat 111, pants 112 and shirt 130 have respective product options 311, 312 and 330 associated therewith, as indicated in FIG. 3. The product options specify color and size dimensions. The gift recipient is able to specify the options he desires using drop-down menus 340.

Figure 4:
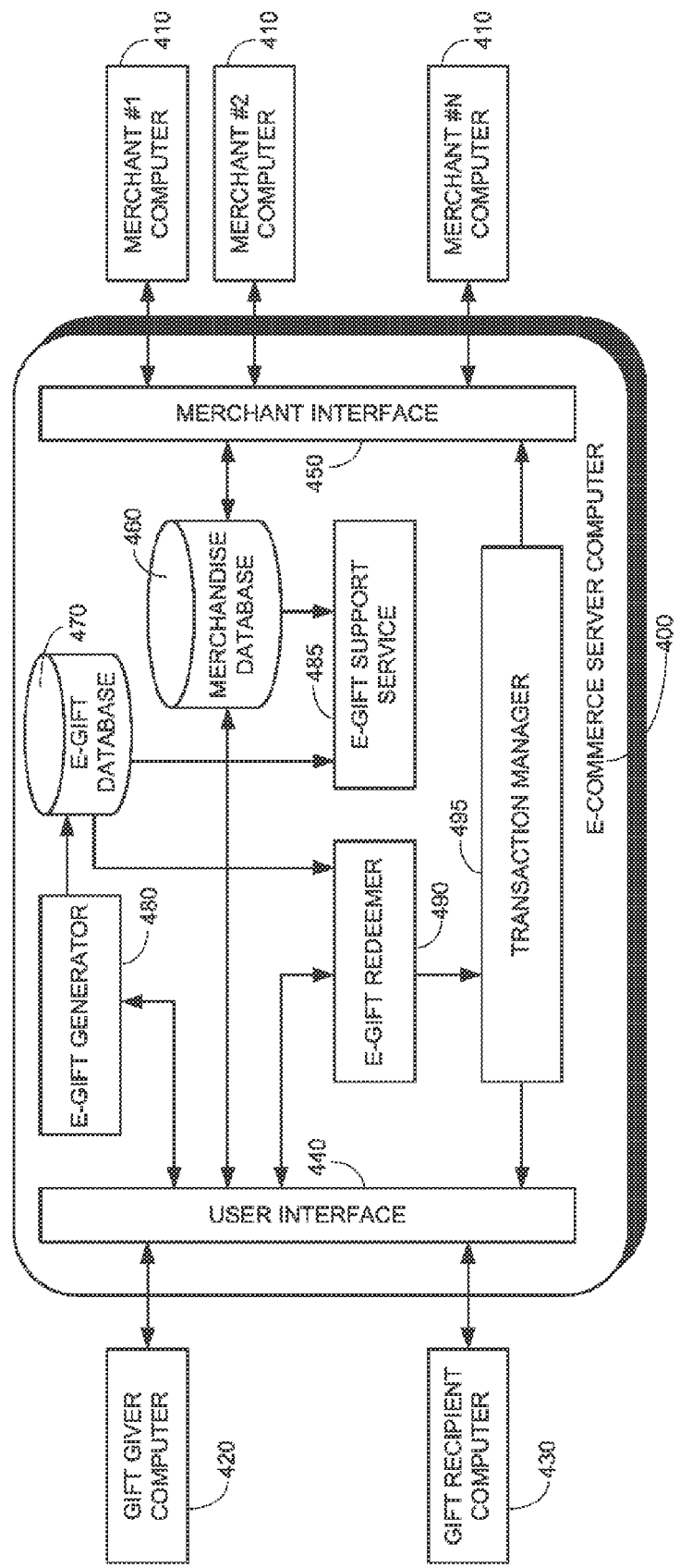
FIG. 4 is a simplified block diagram of an e-commerce system that supports multi-selection gifting, in accordance with an embodiment of the present invention.

Reference is now made to FIG. 4, which is a simplified block diagram of an e-commerce system that supports multi-selection gifting, in accordance with an embodiment of the present invention. Shown in FIG. 4 is an e-commerce server computer 400, which interacts with a plurality of merchant computers 410, at least one gift giver computer 420, and at least one gift recipient computer 430. E-commerce server computer 400 enables merchants 410 to publish and showcase their catalogues of merchandise on a single integrated web site, which functions as a virtual shopping mall. Users browsing the web site are able to purchase one or more items of merchandise from any of merchants 410. Users interact with the web site via a user interface 440, and merchants interact with the web site via a merchant interface 450.

E-commerce server computer 400 is represented as a single computer in FIG. 4 for the sake of clarity. However, e-commerce server computer 400 may be embodied in a single computer, or distributed as multiple computers communicating with one another. In the embodiment shown in FIG. 15, for example, e-commerce server computer 400 includes multiple application servers, administration servers, search servers and load balancers.

Generally, users of e-commerce server computer 400 subscribe to the system by providing basic user information including inter alia name, physical address, e-mail address, billing information, shipping information, and personal information that may be used for authenticating the subscriber.

A merchandise database 460 stores records for each item of merchandise published by any of merchants 410. Each record includes (i) a stock keeping unit (SKU) for the item of merchandise, (ii) a description of the item, (iii) a description of product options for the item, (iv) a price of the item with and without the product options, (v) shipping information for the item including shipping cost, and (vi) the merchant who provides the item. The SKU functions as a unique identifier for the item of merchandise. The description generally includes a thumbnail image of the item and a text description.

Merchants 410 may also be providers of services and, accordingly, the items of merchandise published by such merchants are in the nature of services.

User interface 440 enables users to browse merchandise database 460, search for desired items and services, and purchase desired items and services on-line. Merchant interface 450 enables merchants to continually add new items of merchandise to merchandise database 460, remove old items of merchandise, and modify existing items of merchandise.

In accordance with an embodiment of the present invention, users may create and purchase multi-selection gifts for other users. A multi-selection gift has a set of items or services from one or more merchants, from which the gift recipient may select one or more of the items of services as his gift. Specifically, a multi-selection gift includes (i) a gift recipient, (ii) a plurality of merchandise items SKUs, and (iii) at least one rule constraining the gift recipient's selections. Examples of gift selection rules are inter alia as follows.

Allow the recipient to select all items from the multi-selection gift.

Allow the recipient to select only one item from the multi-selection gift.

Allow the recipient to select up to a specified limit of items from the multi-selection gift.

Allow the recipient to select items from the multi-selection gift up to a specified total cost.

Define groupings of the items, each group including at least one of the items from the multi-selection gift, and allow the recipient to select one of the groups.

Logical AND/OR combinations of two or more of the above selection rules.

Multi-selection gifts are stored in an e-gift database 470. An e-gift generator 480 enables gift giver 420 to generate a multi-selection gift. For example, e-gift generator 480 may employ a user interface such as that shown in FIG. 1 to enable gift giver 420 to generate his multi-selection gift. When gift giver 420 generates the gift, an e-gift support service 485 notifies gift recipient 430 and provides him with an identifier for the gift. The identifier for the gift is used to locate the record for the gift within e-gift database 470.

Gift recipient 430 may or may not be a subscriber to e-commerce server computer 400. In one embodiment of the present invention, gift recipient 430 may be required to subscribe in order to redeem his multi-selection gift. In another embodiment of the present invention, gift recipient 430 may be enabled to redeem his gift without subscribing to the system.

E-gift support service 485 enables gift recipient 430 to redeem his gift. Gift recipient 430 presents his gift identifier to e-gift redeemer 490. E-gift support service 485 may authenticate gift recipient 430 based on subscriber information provided by e-gift recipient 430 at the time of subscription to e-commerce server 400, or by one or more criteria specified by gift giver 420.

In accordance with the present invention, an e-gift redeemer 490 interactively guides gift recipient 430 in choosing items from his multi-selection gift in compliance with the rules set by gift giver 420. For example, e-gift redeemer 490 may employ a user interface such as that shown in FIGS. 2A and 2B to guide gift recipient 430 in making his gift selections. In accordance with an embodiment of the present invention, user interface 440 displays the gift items with "Select" controls 250 that the recipient can independently select or un-select. If gift giver 420 has indicated that gift recipient 430 may select all of the gift items, then all of the "Select" controls are auto-selected by default. Gift recipient 430 may then un-select items that he does not want.

If gift giver 420 has indicated that gift recipient 430 may select up to a prescribed number of items, then all of the "Select" controls are un-selected by default. User interface 440 displays a counter 251 so that gift recipient may easily see how many selections he has made, or how many permitted selections remain.

If gift giver 420 has indicated that gift recipient 430 may select items up to a prescribed cost, then all of the "Select" controls are un-selected by default. User interface 440 displays a counter 261 with a running unspent balance, or alternatively a running total of current cost. In one embodiment of the present invention, gift giver 420 may designate that any unspent amount below the prescribed cost be automatically converted into a multi-vendor gift certificate. In another embodiment of the present invention, gift recipient 430 has an option of covering the additional cost that the total cost of his selected items exceeds the prescribed cost by gift giver 420.

If gift giver 420 has grouped together items of the multi-selection group into prescribed groupings, then user interface 440 displays the items grouped together as a single selection, such as selection 110 in FIG. 2A and selection 220 in FIG. 2B.

After gift recipient 430 has made his selection of items from the multi-selection gift in compliance with the gift's rules, and confirmed his selections, a transaction manager 495 aggregates the selected gifts according to merchant. Transaction manager 495 issues purchase orders to merchants 410 according to the aggregated selected gifts. Transaction manager 495 also issues an invoice for all of the selected gifts to gift giver 420. The selected gifts are then shipped to gift recipient 430, and the multi-selection gift is marked as "redeemed" in e-gift database 470.

Figure 5:
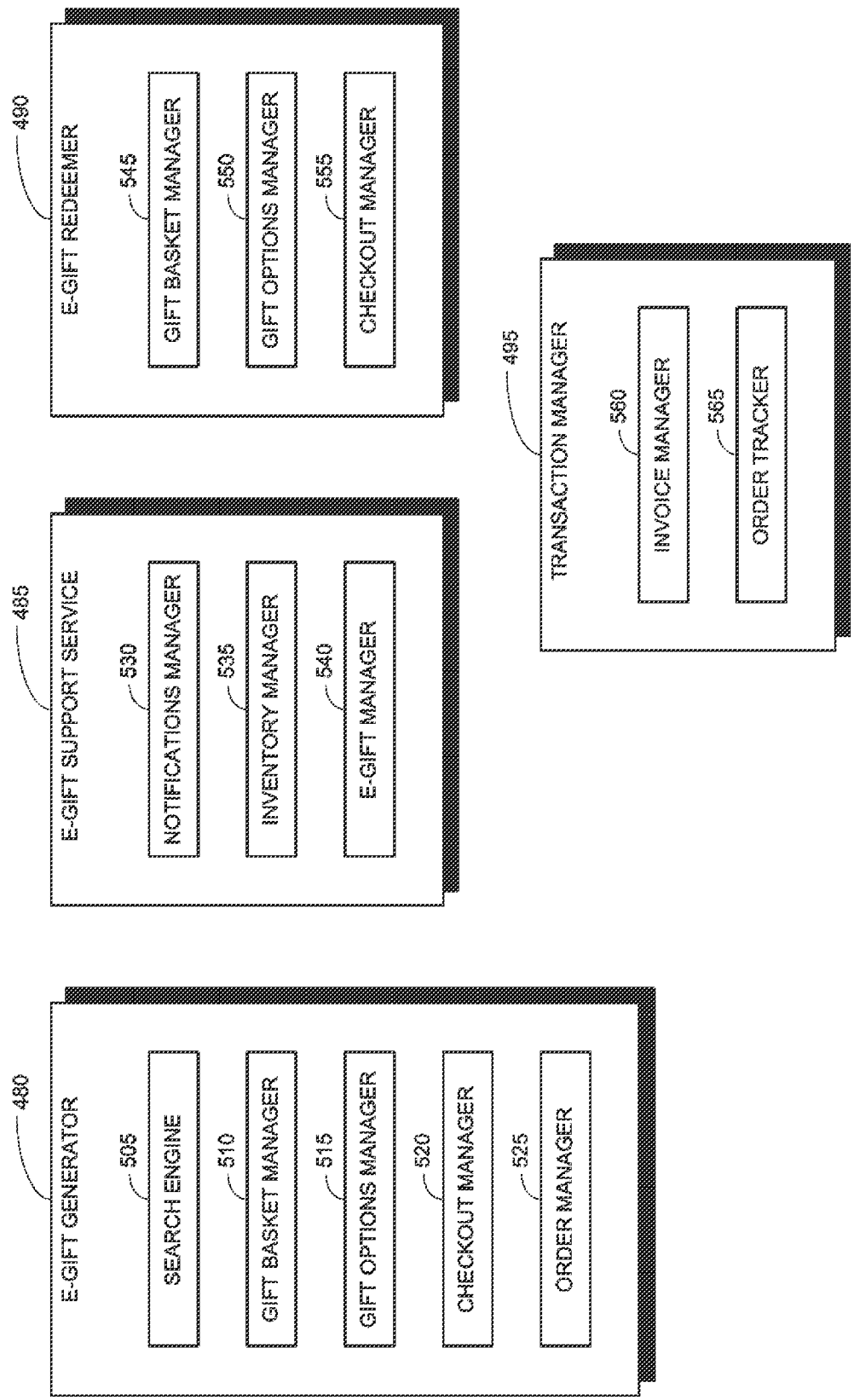
FIG. 5 is a simplified block diagram of various components of the e-commerce system illustrated in FIG. 4, in accordance with an embodiment of the present invention.

Reference is now made to FIG. 5, which is a simplified block diagram of various components of the e-commerce system illustrated in FIG. 4, in accordance with an embodiment of the present invention. Shown in FIG. 5 are sub-components of e-gift generator 480, e-gift support service 485, e-gift redeemer 490, and transaction manager 495.

E-gift generator 480 includes a search engine 505 for searching merchandise database 460 to locate desired items of merchandise or desired services. E-gift generator 480 further includes a gift basket manager 510 for collecting the gift choices that the gift giver includes in his multi-selection gift. Gift basket manager 510 manages presentation of the gift choices, including a display order for the choices, an optional background, and optional multimedia including music, images and video. E-gift generator 480 further includes a gift options manager 515 for generating redemption options; i.e., gift rules. E-gift generator further includes a checkout manager 520 for providing tools that enable the gift giver to specify the gift recipient(s), timing and method of delivery, and personalized greetings and messages. Finally, e-gift generator 480 includes an order manager 525 for managing financial details of the gift giver's purchase. Order manager 525 also obtains merchant coupons and rebate information, for possible use when the multi-selection gift is redeemed.

E-gift support service 485 includes tools for ensuring gift integrity, including inventory checking and gift expiration date. E-gift support service 485 includes a notifications manager 530 for notifying the gift recipient that a multi-selection gift has been sent to him by the gift giver, for notifying the gift giver that the gift has been redeemed or rejected, for alerting the gift giver that the recipient has not yet redeemed his gift after a certain period of time, for enabling the recipient to send a message back to the gift giver, and for alerting the sender and the recipient if any of the gift choices are lost due to product unavailability. E-gift support service 485 also includes an inventory manager 535 for managing the inventory adjustments associated with the multi-selection gift. E-gift support service 485 also includes an e-gift manager 540 for providing tools that enable the gift giver to manage a sent multi-selection gift, including inter alia re-addressing the gift, modifying the contents of the gift, modifying the redemption rules of the gift, cancelling the gift, re-issuing the gift, and cloning the gift.

E-gift redeemer 490 includes a gift basket manager 545 for presenting the gift giver's gift to the recipient, and for collecting the gift selections made by the recipient. Gift basket manager 545 manages presentation of the gift choices, including a display order for the choices, an optional display indicating how the recipient's current selections compare with constraints defined by the gift giver, an optional background, and optional multimedia including music, images and video. E-gift redeemer 490 also includes a gift options manager 550 for presenting and specifying product options, as applicable, associated with the recipient's selected items, such as size, color, and monogramming, as shown in FIG. 3. E-gift redeemer 490 includes a checkout manager 555 for obtaining delivery information including at least one physical address, for optionally obtaining payment information from the gift recipient to cover any overcharge, and for managing the database transaction associated with the gift recipient's redemption of his multi-selection gift.

Transaction manager 495 includes an invoice manager 560 for invoicing the gift giver based upon the gift recipient's gift selections, and an order tracker 565 for tracking the gifts ordered by the gift recipient.

Figure 6:
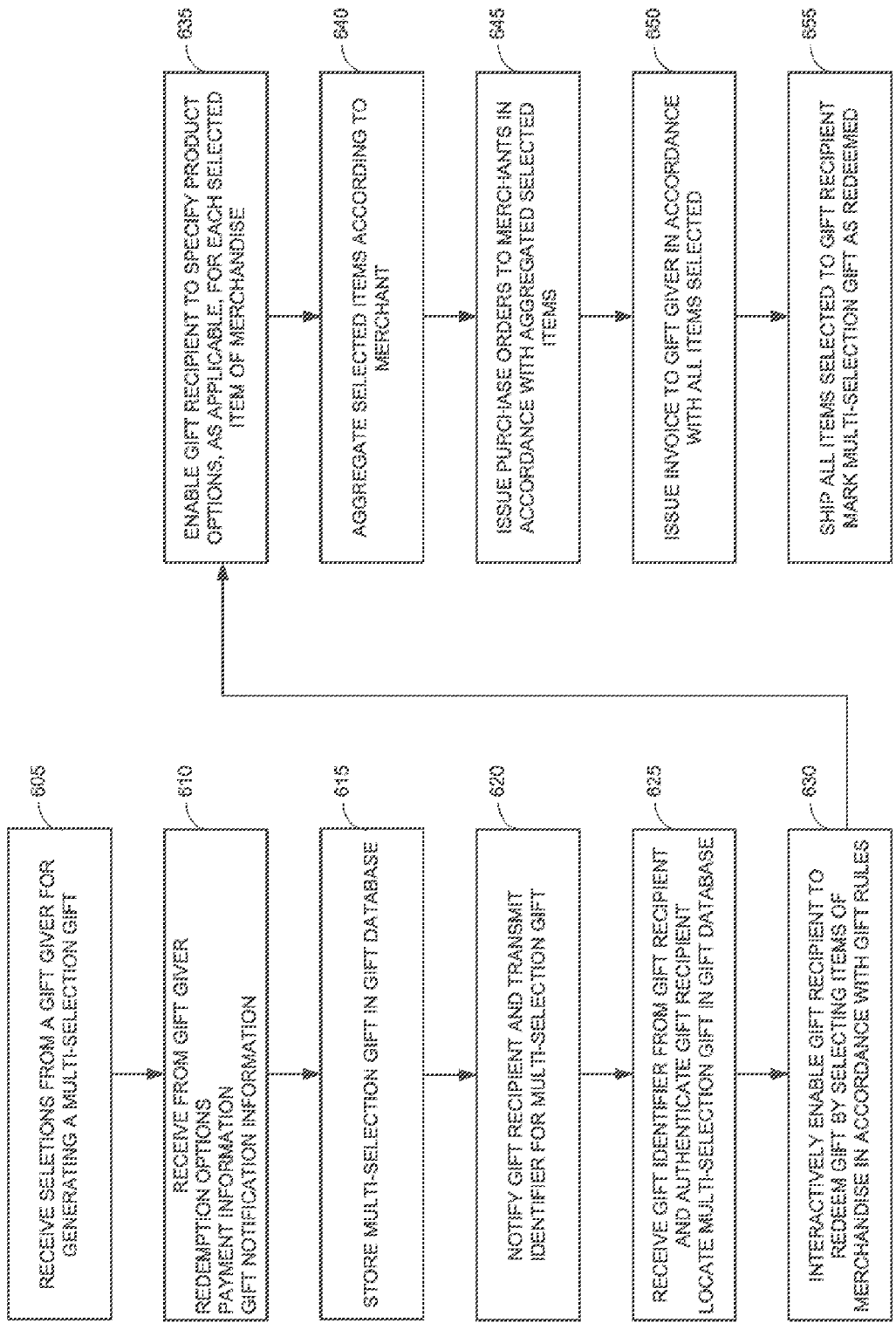
FIG. 6 is a simplified flowchart of an overall method for multi-selection gifting, in accordance with an embodiment of the present invention.

Reference is now made to FIG. 6, which is a simplified flowchart of an overall method for multi-selection gifting, in accordance with an embodiment of the present invention. The method of FIG. 6 is performed by an e-commerce system, such as e-commerce computer server 400 of FIG. 4. At step 605 the e-commerce system receives selections from a gift giver for generating a multi-selection gift, intended for a designated gift recipient. Step 605 is described in detail below with reference to FIG. 7. At step 610 the e-commerce system receives from the gift giver (i) gift redemption options, also referred to as gift rules, (ii) payment information, and (iii) notification information. Notification information includes inter alia recipient addressing, notification date, gift message, and gift presentation options such as background, video clips and sound clips. Specifying gift redemption options at step 610 is described in detail below with reference to FIG. 9. At step 615, information describing the generated multi-selection gift is stored within a gift database, such as e-gift database 470 of FIG. 4. At step 620 the e-commerce system notifies the gift recipient of his multi-selection gift, and sends him an identifier that he may present for redemption of his gift. The gift identifier is used to locate the information for the multi-selection gift within the gift database. Notification may be inter alia by way of a link sent in an e-mail or in a text message, where the link includes an identifier.

At step 625 the system receives the gift identifier from the gift recipient, who wishes to redeem his gift, authenticates the gift recipient, determines that the gift is still redeemable, and locates the multi-selection gift information within the gift database. At step 630 the system interactively guides the gift recipient in selecting one or more items of merchandise from the items in the multi-selection gift, in accordance with the rules of the gift as prescribed by the gift giver. Step 630 is described in detail below with reference to FIGS. 10-14.

At step 635 the gift recipient specifies product options, as applicable, for the gifts he selected at step 630. Product options may include inter alia size, color and monogramming, as shown in FIG. 3. At step 640 the system aggregates the items selected by the gift recipient according to merchant. At step 645 the system generates purchase orders with the gift giver's payment methods and any applicable coupons discount codes provided by the gift giver. It is noted that the gift giver's payment method may vary from item to item if more than one gift choice is redeemed, depending upon the merchant's requirements. The system then issues the purchase orders to the merchants. At step 650 the system issues an invoice to the gift giver for all of the selected items. At step 655 the selected items are shipped to the gift recipient. The multi-selection gift is then marked as "redeemed" in the gift database.

It will be appreciated by those skilled in the art that the invoice is issued to the gift giver at step 650, after the gift recipient has made his gift choice selections to redeem his multi-selection gift. As such, the gift giver is not billed until the recipient redeems his gift. As mentioned hereinabove, prior art gifting technologies, in distinction to the present invention, bill the gift giver at the time of purchase of his gift.

Figure 7:
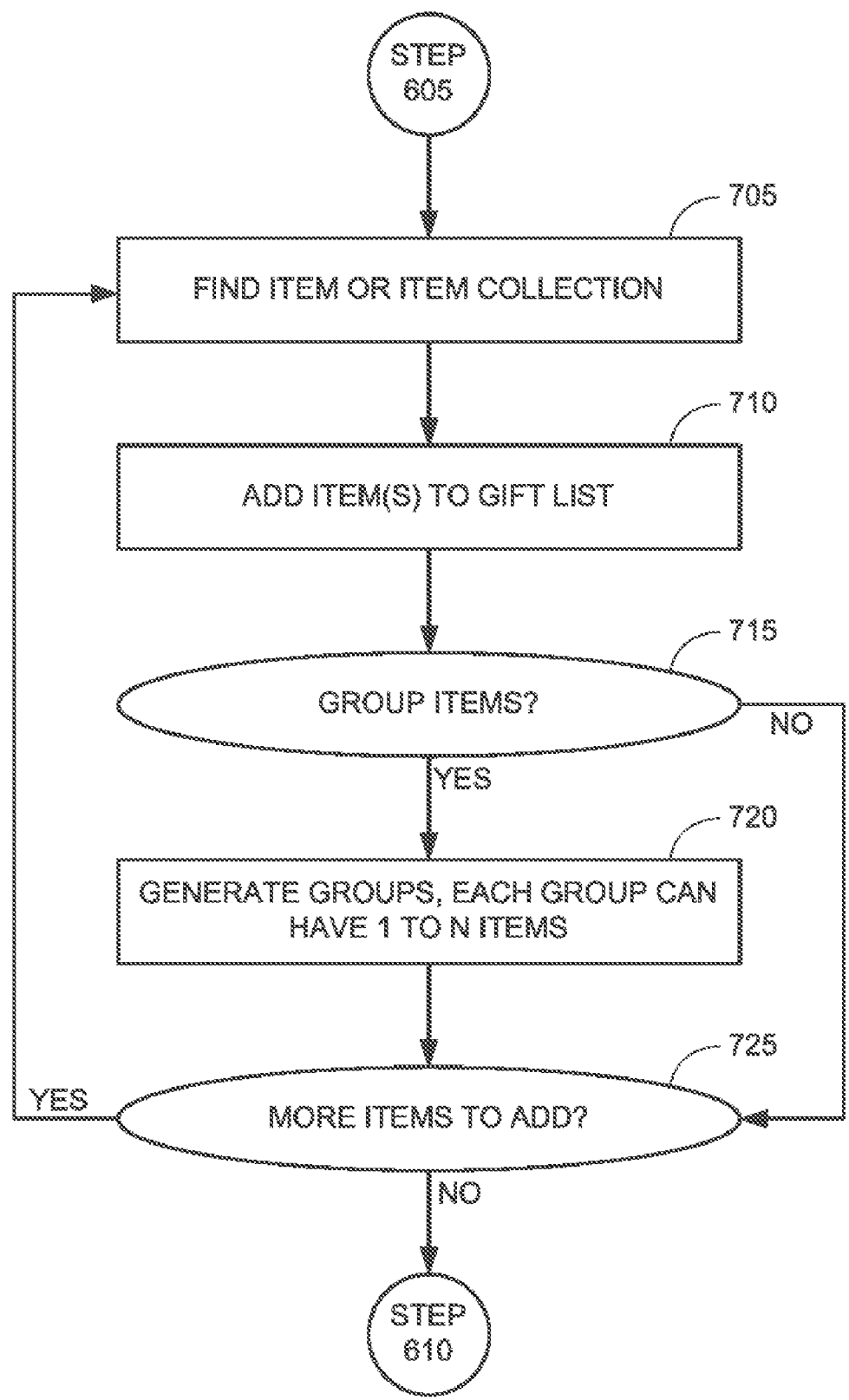
FIG. 7 is a simplified flowchart of a method for selecting a list of gift items to be included in a multi-selection gift, in accordance with an embodiment of the present invention.

Reference is now made to FIG. 7, which is a simplified flowchart of a method for selecting a list of gift choices to be included in a multi-selection gift, in accordance with an embodiment of the present invention. The flowchart of FIG. 7 corresponds to step 605 from FIG. 6. The flowchart of FIG. 7 is preferably implemented by a user interface, such as the user interface illustrated in FIG. 1.

At step 705 the gift giver finds an item or an item collection to include in his multi-selection gift. In accordance with an embodiment of the present invention, the gift giver is assisted in locating appropriate gift items by search engines, guided navigation, historical and demographic data, shopping assistants, and other such tools. In addition, pre-built lists of gifts are presented to the gift giver for possible use. Such pre-built lists may be generated by merchants, other customers, by operators of e-commerce system 400, and by free-lance gift creators. Items from pre-built lists may be selectively excluded by the gift giver from the multi-selection gift.

At step 710 the gift giver adds the item or item collection to the gift list for his multi-selection gift. At step 715 the gift giver decides whether or not to group the items in the multi-selection gift into one or more groups. Referring to FIG. 1, grouping is accomplished by using group and un-group controls 171 and 172, respectively.

If the gift giver decides to group items, then at step 720 the gift giver generates the groups. Each group can have 1 to N items, where N is the total number of items in the gift list. Any item in the gift list can be a member of one or more groups. The gift list may have both grouped and ungrouped selections. The default for a multi-selection gift is for the items to be un-grouped. The gift giver may specify whether or not the gift recipient can break apart, or "un-group" a group selection when he redeems his multi-selection gift. Referring again to FIG. 1, a control 190 may be set by the gift giver to enable the gift recipient to break apart a group of items.

Figure 8:
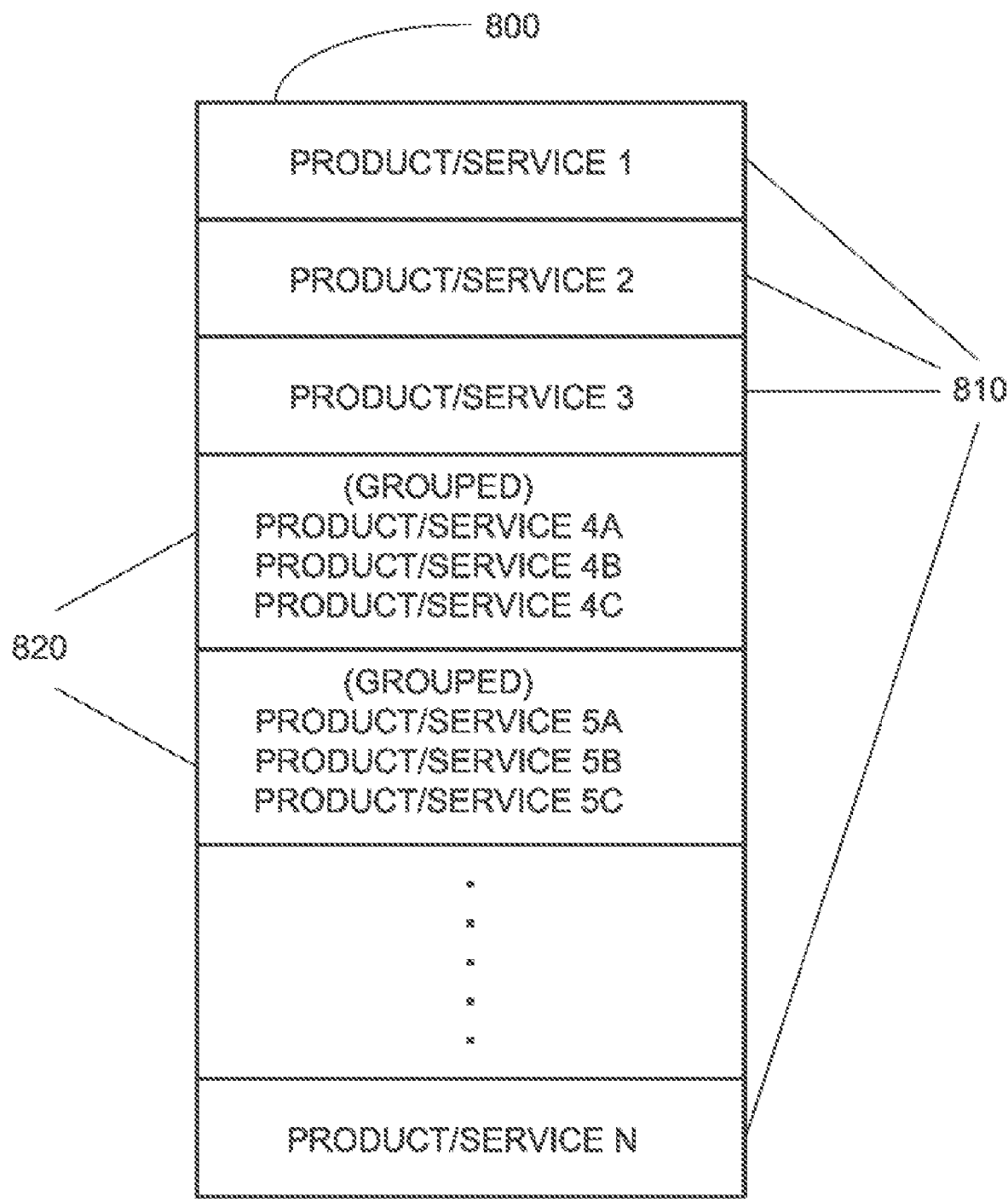
FIG. 8 is a simplified illustration of a multi-selection gift, in accordance with an embodiment of the present invention.

In this regard, reference is now made to FIG. 8, which is a simplified illustration of a multi-selection gift 800, in accordance with an embodiment of the present invention. Gift 800 includes a gift list, each member of the gift list being a single item or a group of items. The multi-selection gift 800 of FIG. 8 includes un-grouped individual product/service items 810 and grouped product/service items 820. The multi-service gift shown in FIG. 1 has such un-grouped and grouped gift choices. For example, grouped items may include a matching jacket and pants, and un-grouped items may include a variety of shirts and ties. The items in a group may be from different merchants. Moreover, groups can be nested as groups and sub-groups.

It will be appreciated by those skilled in the art that the multi-selection gift illustrated in FIG. 8 is exemplary, and is not meant to imply any specific limitations or storage configurations or presentation methods.

Figure 9:
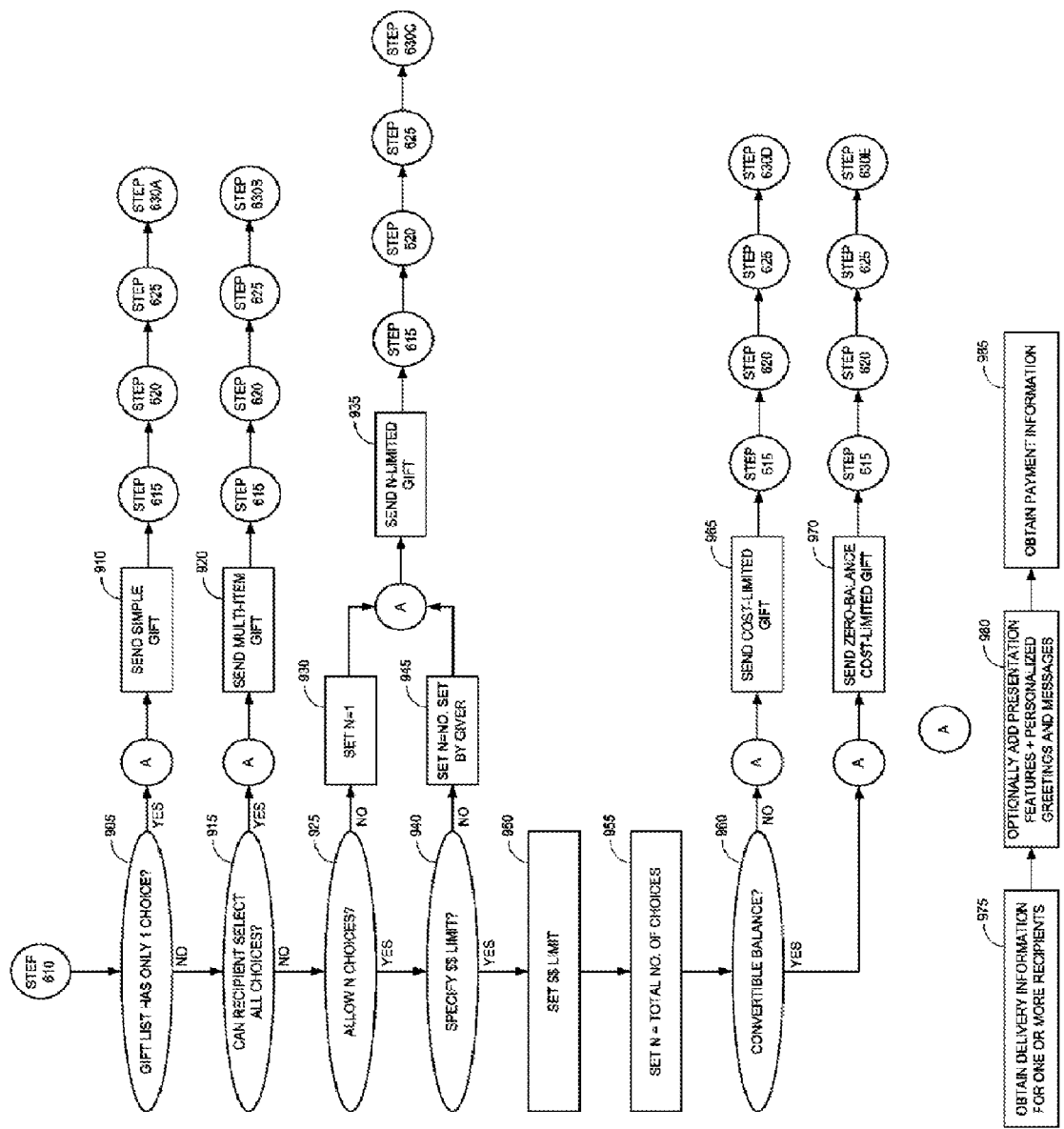
FIG. 9 is a simplified flowchart of a method for generating gift redemption options for a multi-selection gift, in accordance with an embodiment of the present invention.

Reference is now made to FIG. 9, which is a simplified flowchart of a method for generating gift redemption options for a multi-selection gift, in accordance with an embodiment of the present invention. The flowchart of FIG. 9 corresponds to step 610 from FIG. 6. At step 905 a determination is made whether the gift list for the multi-selection gift, as generated via the flowchart of FIG. 7, has only a single choice. A single choice may be either a single un-grouped item, or a single group of items. If so, then processing proceeds to step A for post-processing, as described hereinbelow, and then to step 910 where the gift is sent as a simple gift. Redemption of a simple gift is described below with reference to FIG. 10.

If the multi-selection gift has more than a single choice, as determined at step 905, then the gift giver decides at step 915 whether or not the gift recipient can select all choices in the gift list. If so, processing proceeds to step A for post-processing, and then to step 920 where the gift is sent as a multi-item gift. Redemption of a multi-item gift is described below with reference to FIG. 11.

If the gift giver decides at step 915 that the gift recipient cannot select all choices, then the gift giver decides at step 925 whether the gift recipient is to be limited to selecting a maximum number, N>1, of choices in the gift list. Referring back to FIG. 1, the gift giver has designated a maximum of N=2 selections. If the gift giver does not want to permit more than one selection, then at step 930 the parameter N, corresponding to the number of choices that the gift recipient may make, is set to N=1. Processing then proceeds to step A for post-processing, and then to step 935 where the gift is sent as an N-limited gift (with N=1 in this case). Redemption of an N-limited gift is described below with reference to FIG. 12.

If the gift giver decides at step 925 that the recipient may select up to N>1 choices in the gift list, then at step 940 the gift giver decides whether to set a limit on the total cost of the items selected. Referring back to FIG. 1, the gift giver may designate a maximum total cost, such as $300. In accordance with an embodiment of the present invention, a maximum total cost figure is auto-suggested to the gift giver based on the items currently included in the multi-selection gift. If the gift giver does not want to limit the total cost, then at step 945 the parameter N above is set to the limit designated by the gift giver. Processing then proceeds to step A for post-processing, and then to step 935 where the gift is sent as an N-limited gift. Redemption of an N-limited gift is described below with reference to FIG. 12.

If the gift giver decides at step 940 to set a limit on the total cost of the items selected, than at step 950 the gift giver designates a cost limit. At step 955 the parameter N above is set to the total number of choices in the gift list. At step 960 the gift giver decides whether or not the balance of the multi-selection gift may be converted to a gift certificate. Referring back to FIG. 1, the gift giver may click on a control 141 in order to have the unused balance of the gift amount converted into a gift certificate for the gift recipient. If the gift giver does not want to have the unused balance converted into a gift certificate, then processing proceeds to step A for post-processing, and at step 965 the gift is sent to the recipient as a cost-limited gift. Redemption of cost-limited gifts is described below with reference to FIG. 13.

Finally, if the gift giver decides at step 960 that the balance of the multi-selection gift may be converted to a gift certificate, then at step 970 the gift is sent as a zero-balance cost-limited gift. Redemption of zero-balance cost-limited gifts is described below with reference to FIG. 14.

Post-processing step A includes three sub-steps, as follows. At step 975 the gift giver provides delivery information, including timing and method of delivery, for one or more gift recipients. The gift giver may choose from a variety of delivery media, including inter alia a physical gift card, e-mail delivery and text message delivery. At step 980 the gift giver optionally adds gift presentation features such as image background, video clips and sound clips. The gift giver also optionally adds one or more personalized greetings and messages to his gift. At step 985 the gift giver provides his payment information, to pay for the multi-selection gift when it is redeemed.

It will be appreciated by those skilled in the art that the decision sequence illustrated in FIG. 9 is exemplary, and is not intended to imply a fixed decision sequence. Moreover, not all decisions in FIG. 9 and their related processes need be implemented, and additional decisions and related processes may be used instead of or in addition to those illustrated in FIG. 9.

Figure 10:
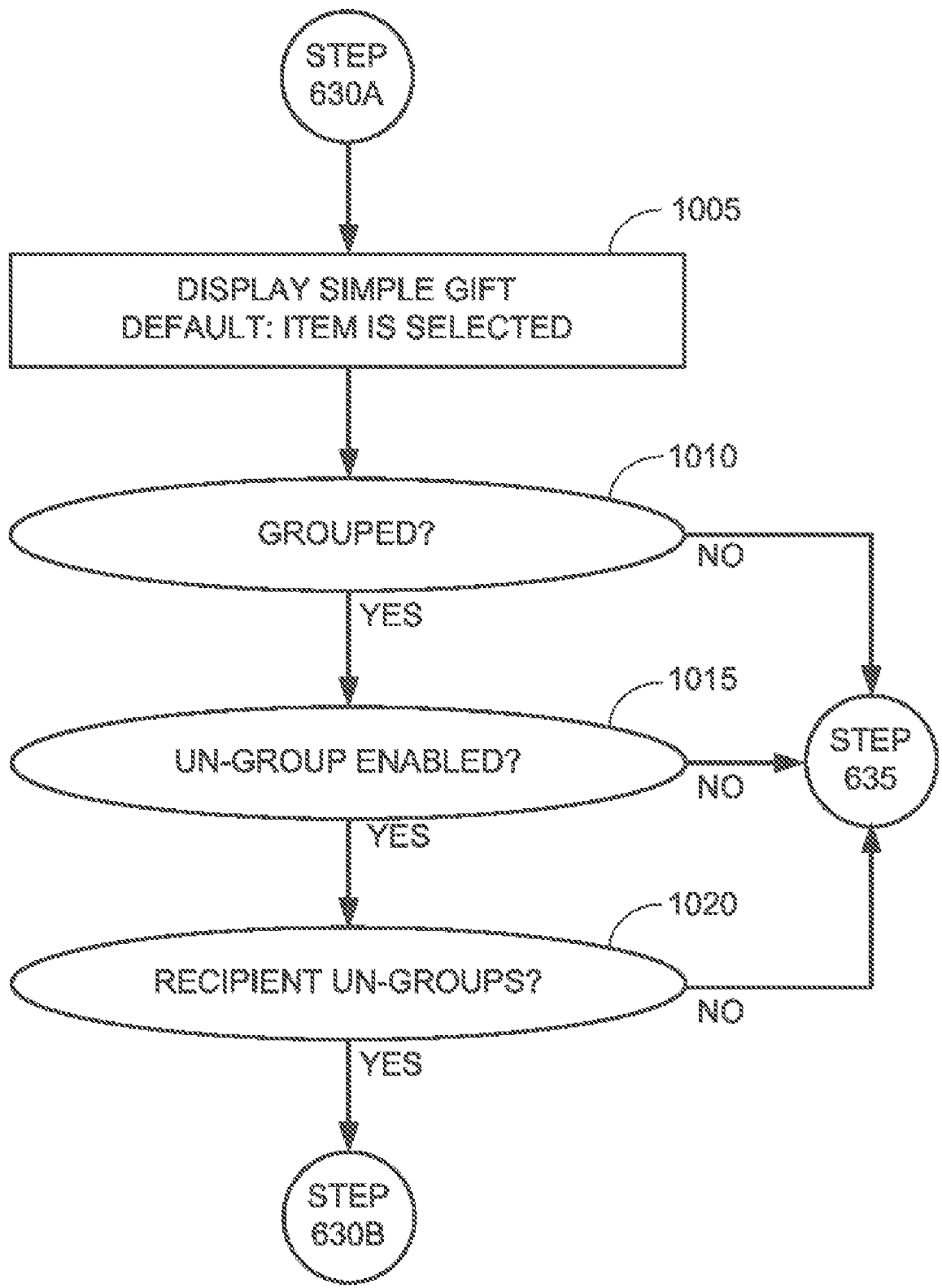
FIG. 10 is a simplified flowchart of a method for redeeming a simple gift, in accordance with an embodiment of the present invention.

Reference is now made to FIG. 10, which is a simplified flowchart of a method for redeeming a simple gift, in accordance with an embodiment of the present invention. The flowchart of FIG. 10 corresponds to one case of step 630 from FIG. 6. At step 905 the simple gift is displayed to the gift recipient. The one choice of the simple gift is selected by default. At step 1010 a determination is made whether the simple gift is a group of items. If not, no further selections are required on the part of the gift recipient, and the gift is redeemed by proceeding to step 635 of FIG. 6. If the simple gift is a group of items, as determined at step 1010, then a determination is made at step 1015 whether the recipient is able to un-group the items; i.e., whether the gift giver has given the gift recipient the option of un-grouping the items. The ability to un-group items is generally indicated by an un-group control, such as control 280 shown in FIGS. 2A and 2B.

If the recipient does not have the option to un-group the grouped items, then no further selections are required on the part of the gift recipient, and the gift is redeemed by proceeding to step 635 of FIG. 6.

If the recipient is able to un-group the items, as determined at step 1015, then a determination is made at step 1020 whether the recipient wishes to do so.

If so, then the items in the group are un-grouped, the gift then becomes a multi-item gift, and processing proceeds to step 630B of FIG. 6, for redemption of a multi-item gift. If not, then no further selections are required on the part of the gift recipient, and the gift is redeemed by proceeding to step 635 of FIG. 6.

Figure 11:
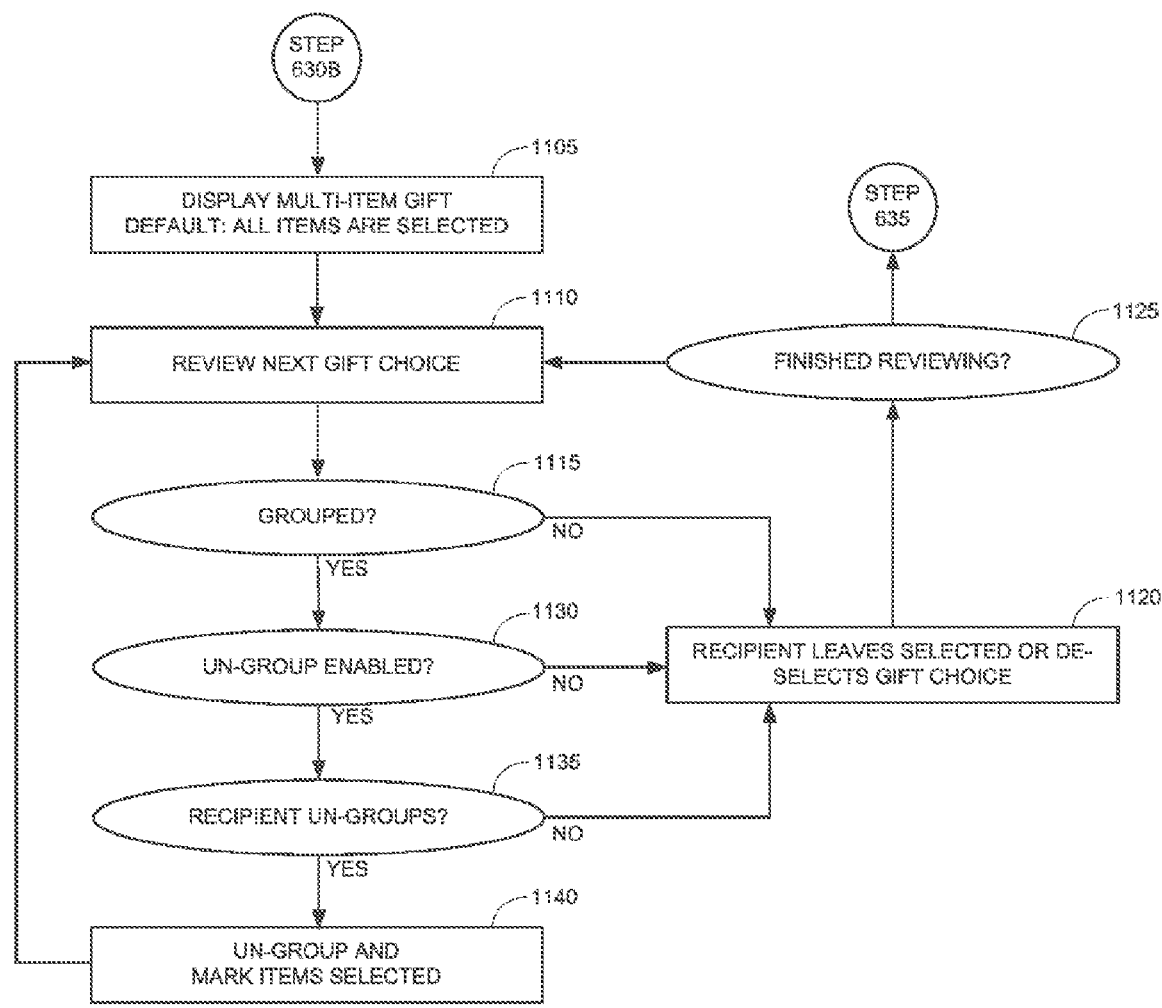
FIG. 11 is a simplified flowchart of a method for redeeming a multi-item gift, in accordance with an embodiment of the present invention.

Reference is now made to FIG. 11, which is a simplified flowchart of a method for redeeming a multi-item gift, in accordance with an embodiment of the present invention. The flowchart of FIG. 11 corresponds to one case of step 630 from FIG. 6. At step 1105 the multi-item gift is displayed to the gift recipient. By default, all items in the gift are selected.

The recipient is interactively guided in making his gift selections. At step 1110 the gift recipient reviews the next choice in the gift list. At step 1115 a determination is made whether the choice being reviewed is part of a group of items.

If not, then at step 1120 the recipient decides whether to leave the gift choice selected, or else un-select it. At step 1125 a determination is made whether or not there are more gift choices to review. If so, processing returns to step 1110. If not, processing advances to step 635 of FIG. 6.

If the gift choice being reviewed by the gift recipient is part of a group of items, as determined at step 1115, then a further determination is made at step 1130 whether or not the recipient may un-group the items grouped together; i.e., whether or not the gift giver has enabled the gift recipient to un-group the items.

If not, the method moves to step 1120 as above. If so, the gift recipient decides at step 1135 whether or not he wishes to un-group the group of items. Generally, the gift recipient un-groups a group of items by clicking on an un-group control, such as control 280 in FIGS. 2A and 2B.

If not, the method moves to step 1120 as above. If so, the items in the group are un-grouped, and marked by default as selected. The method then returns to step 1110, for sequentially reviewing the now un-grouped items.

Figure 12:
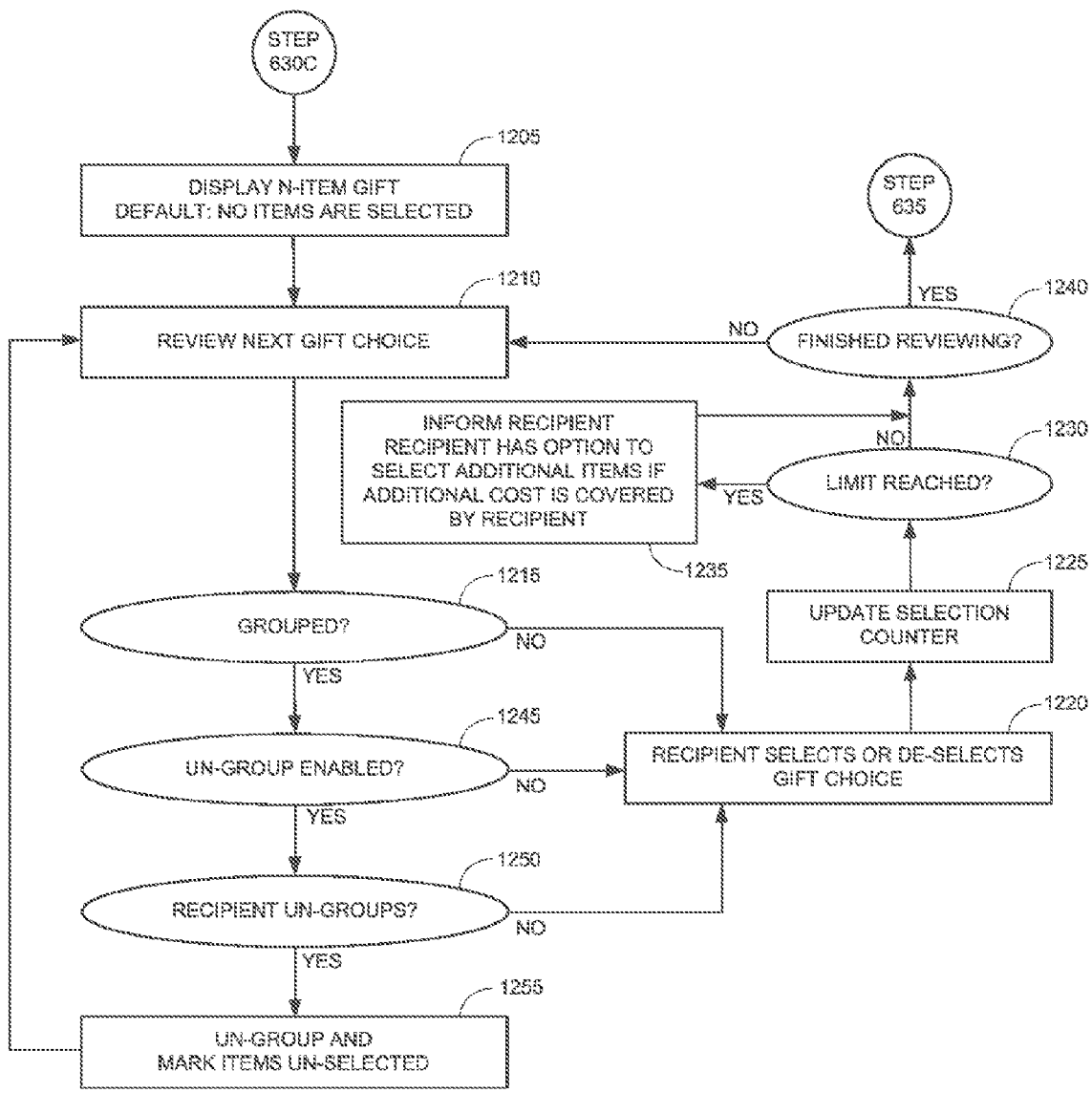
FIG. 12 is a simplified flowchart of a method for redeeming an N-item gift, in accordance with an embodiment of the present invention.

Reference is now made to FIG. 12, which is a simplified flowchart of a method for redeeming an N-limited multi-selection gift, in accordance with an embodiment of the present invention. The flowchart of FIG. 12 corresponds to one case of step 630 from FIG. 6. At step 1205 an N-limited gift is displayed to the gift recipient. By default, none of the items in the gift are selected. Referring back to FIGS. 2A and 2B, the four selection boxes corresponding to the four gift choices are initially all un-selected.

The recipient is interactively guided in making his gift selections. At step 1210 the gift recipient reviews the next choice in the gift list. At step 1215 a determination is made whether or not the gift choice being reviewed is part of a group of items. If not, then at step 1220 the recipient decides whether or not to select the gift choice. The recipient selects a gift choice by clicking in the corresponding select box, such as select boxes 250 of FIGS. 2A and 2B. At step 1225 a selection counter, such as counter 251 of FIG. 2A, is updated to reflect the number of gifts the recipient has already selected. The selection counter may be a running total of the number of gifts that the recipient has selected thus far, or a running balance of the number of selections remaining, or both.

At step 1230 a determination is made whether or not the designated limit on the number of selections has been reached. If so, at step 1235 the recipient is informed of such, and advised that he has the option of selecting additional items if he agrees to cover the additional cost beyond the designated gift limit. At step 1240 a determination is made whether or not the recipient has finished reviewing all of the gift choices.

If not, then the method returns to step 1210 to process the next gift choice. If so, then processing continues at step 635 of FIG. 6. If the limit on the number of selections made thus far has not been reached, as determined at step 1230, then the method advances directly from step 1230 to step 1240.

If the gift giver has included multiple quantities of items in a multi-selection gift, such as by entering quantities greater than one in boxes 180 of FIG. 1, then the gift recipient may select one or more units of such items, up to the quantities set by the gift giver. In one embodiment of the present invention, each unit of an item selected counts as one selection. In another embodiment of the present invention, selecting as many units as allowed by the gift giver counts as a single selection.

If the gift choice currently being reviewed by the gift recipient is part of a group of items, as determined at step 1215, then at step 1245 a further determination is made whether or not the items of the group may be un-grouped; i.e., whether or not the gift giver has enabled the gift recipient to un-group the items.

If not, then the method moves to step 1220 as above. If so, then at step 1250 the recipient decides whether or not to un-group the group if items.

If not, then the method moves to step 1220 as above. If so, then at step 1255 the items of the group are un-grouped as individual items and marked as un-selected. In one embodiment of the present invention, if the gift giver un-groups a grouped gift choice, then subsequent selections of any number of those items, up to the full set of items belonging to the original group still counts as only one gift choice. In an alternative embodiment of the present invention, such subsequent selections count as separate gift choices. The method then returns to step 1210, to sequentially process the now un-grouped items.

When the recipient agrees to cover the additional cost of his gift selections, above the limit designated by the gift giver, then the selection counter used at step 1225 may indicate the amount of cost that the recipient has to cover if he wishes to proceed with his current selections.

In an alternative embodiment of the present invention, step 1235 may also provide an option for having the gift giver arrange to cover the additional cost. Specifically, a request to the gift giver is sent via e-gift support service 485, with release of the gift order delayed until approval is given by the gift giver via e-gift support service 485. If the gift giver denies the request, the gift order is cancelled and the gift recipient is given another opportunity to redeem his gift.

Figure 13:
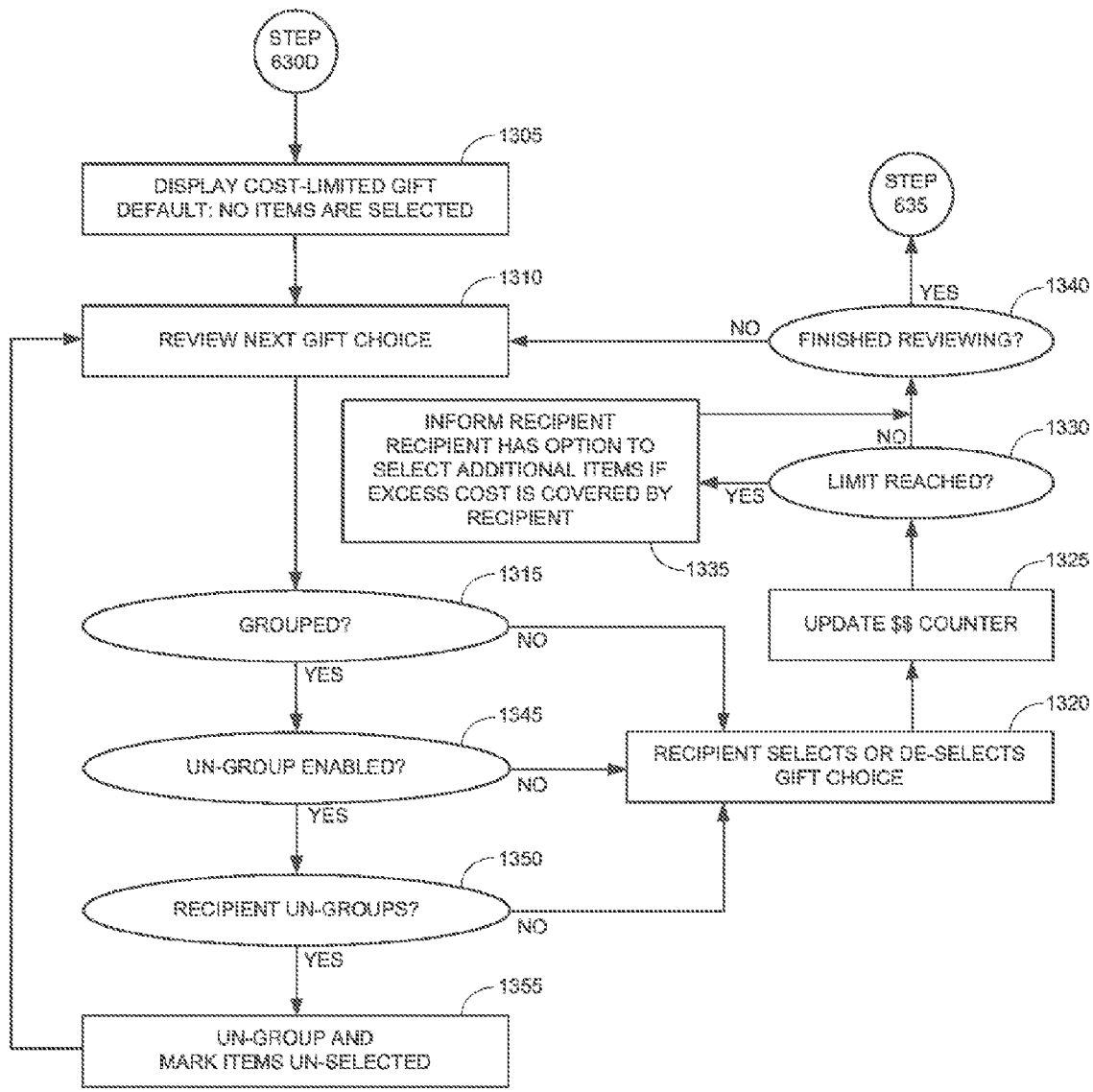
FIG. 13 is a simplified flowchart of a method for redeeming a cost limited gift, in accordance with an embodiment of the present invention.

Reference is now made to FIG. 13, which is a simplified flowchart of a method for redeeming a cost limited gift, in accordance with an embodiment of the present invention. The flowchart of FIG. 13 corresponds to one case of step 630 from FIG. 6. At step 1305 the cost-limited gift is displayed to the gift recipient. By default, none of the gift choices are selected.

The recipient is interactively guided in making his gift selections. At step 1310 the recipient reviews the next gift choice from the gift list generated by the gift giver in the flowchart of FIG. 7. At step 1315 a determination is made whether or not the current gift choice being reviewed is part of a group of items. If not, then at step 1320 the gift recipient decides whether or not to select the current gift choice. At step 1325 a cost counter is updated, based on the recipient's selections thus far. The cost counter may be a running total cost for the currently selected goods, or a running balance of the amount left for spending such as counter 261 of FIG. 2B. At step 1330 a determination is made whether or not the designated cost limit has been reached.

If so, at step 1335 the recipient is informed of such, and advised that he has the option of selecting additional items if he agrees to cover the additional cost beyond the designated gift limit. At step 1340 a determination is made whether or not the recipient has finished reviewing the gift choices.

If so, then processing proceeds to step 635 of FIG. 6. If not, then processing returns to step 1310 to review the next gift choice. If it is determined at step 1330 that the designated cost limit has not been reached, then processing advances directly from step 1330 to step 1340.

If it is determined at step 1315 that the current gift choice being reviewed by the recipient is part of a group of items, then a further determination is made at step 1345 whether or not the recipient has the ability to un-group the items; i.e., whether or not the gift giver has enabled the recipient to un-group.

If not, then the method proceeds to step 1320 as above. If so, then the recipient decides at step 1350 whether or not he wishes to un-group the group of items.

If not, then the method proceeds to step 1320 as above. If so, then the items of the group are un-grouped at step 1355, and each individual item is marked as un-selected. The method then returns to step 1310, where the now un-grouped items are sequentially reviewed.

In an alternative embodiment of the present invention, the cost counter used at step 1325 to ensure that the gift recipient does not go over the gift limit may be implemented so as to hide the cost of the gift items. In this alternative embodiment, the cost counter only indicates the overage by which the total cost of the recipient's current selections exceeds the limit designated by the gift giver. When the recipient agrees to cover the additional cost of his gift selections, then the indicated overage is also the amount of cost that the recipient has to cover if he wishes to proceed with his current selections.

As indicated above with reference to FIG. 12, in another alternative embodiment of the present invention, step 1335 may also provide an option for having the gift giver arrange to cover the additional cost.

Figure 14:
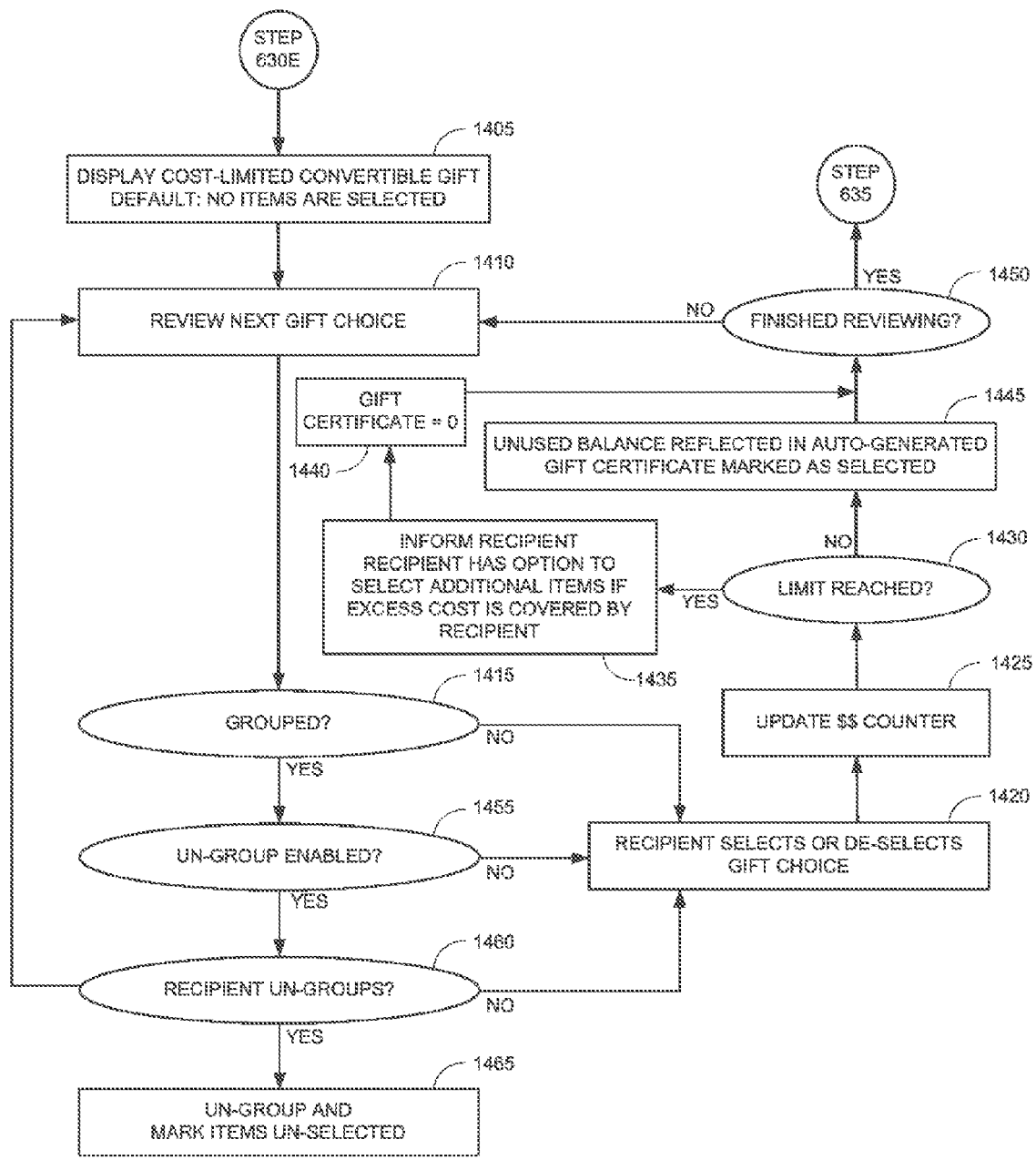
FIG. 14 is a simplified flowchart of a method for redeeming a zero-balance cost-limited gift, in accordance with an embodiment of the present invention.

Reference is now made to FIG. 14, which is a simplified flowchart of a method for redeeming a zero-balance cost-limited gift, in accordance with an embodiment of the present invention. The flowchart of FIG. 14 corresponds to one case of step 630 from FIG. 6. At step 1405 a zero-balance cost-limited gift is displayed to the recipient. By default, none of the gift choices are selected, and an auto-generated gift certificate is generated. The amount of the auto-generated gift certificate may be left empty, or filled in dynamically with the current balance, which initially is the entire cost limit.

The method interactively guides the recipient in making his selections. At step 1410 the next choice in the gift list is reviewed by the recipient for possible selection. At step 1415 a determination is made whether or not the choice currently being reviewed is part of a group of items.

If not, then at step 1420 the recipient decides whether or not to select the gift choice. At step 1425 a cost counter is updated to reflect the cost of the gift selections the recipient has made thus far. The cost counter may be a running total of the cost of the gift selections made, or a running balance of the remaining amount left to be spent. At step 1430 a determination is made whether or not the cost limit designated by the gift giver has been reached.

If so, at step 1435 the recipient is informed of such, and advised that he has the option of selecting additional items if he agrees to cover the additional cost beyond the designated gift limit. At step 1440 the gift certificate for converting the balance is set to an amount of $0, reflecting that no balance is left. The method then advances to step 1450 where a determination is made whether or not the gift recipient has finished reviewing the gift choices.

If so, then processing proceeds to step 635 of FIG. 6. If not, then the method returns to step 1410 where the next gift choice is reviewed. If it is determined at step 1430 that the cost limit has not been reached, then at step 1445 the unused balance is applied to the gift certificate. The gift certificate is marked as selected. As the recipient continues to select gift choices the amount of the gift certificate is changed to reflect the unused balance. If the recipient un-selects all of the gift choices, then the amount of the gift certificate may be left empty, or may reflect the entire limit set by the gift giver.

If the gift giver has included multiple quantities of items in a multi-selection gift, such as by entering quantities greater than one in boxes 180 of FIG. 1, then the gift recipient may select one or more units of such items, up to the quantities set by the gift giver. By selecting fewer units than the quantities set by the gift giver, the unused balance, and hence the gift certificate, is higher.

If it is determined at step 1415 that the current gift choice being reviewed is part of a group of items, then at step 1455 a further determination is made whether or not the gift recipient is able to un-group the group items; i.e., whether or not the gift giver has enabled the gift recipient to un-group.

If not, then the method proceeds to step 1420 as above. If so, then at step 1460 the recipient decides whether or not he wishes to un-group the group of items.

If not, then the method proceeds to step 1420 as above. If so, than at step 1465 the items of the group are un-grouped, and the method proceeds to step 1410 where the now un-grouped items may be reviewed in sequence.

As mentioned above with respect to FIG. 13, in an alternative embodiment of the present invention, the cost counter used at step 1425 to ensure that the gift recipient does not go over the gift limit may be implemented so as to hide the cost of the gift items. In this alternative embodiment, the cost counter only indicates the overage by which the total cost of the recipient's current selections exceeds the limit designated by the gift giver. When the recipient agrees to cover the additional cost of his gift selections, then the indicated overage is also the amount of cost that the recipient has to cover if he wishes to proceed with his current selections.

In another alternative embodiment of the present invention, step 1435 may also provide an option for having the gift giver arrange to cover the additional cost.

FIGS. 11-14 described hereinabove correspond to methods of gift redemption for different types of multi-selection gifts. These methods enable the gift recipient to sequentially review the list of gift choices in his multi-selection gift, and select some or all of the choices, while remaining within the constraints set by the gift giver. It will be appreciated by those skilled in the art that although the methods of FIGS. 11-14 advance through the list of gift choices sequentially, the gift recipient may go back and un-select gift choice selections that he made earlier. Thus, if the gift recipient finds that his desired selections exceed the limits set by the gift giver, the recipient may un-select previously made selections in order to be able to add new selections. Similarly, if the gift recipient finds that a gift choice he sees at a later stage in the review sequence is a desirable substitute for a gift choice he selected earlier, the recipient may undo his earlier selection. Thus, although the methods of FIGS. 11-14 guide the gift recipient through his gift choices in a sequential fashion, this does not limit the gift recipient from making selections out of order and from changing previously made selections.

The recipient has the ability to un-group items that were grouped together by the gift giver. The recipient also has limited ability to re-group items, but he can only do so if the items being re-grouped where originally grouped together by the gift giver. Thus the recipient can re-group all of an original group of items or a subset thereof, but cannot generate new groupings.

It will be appreciated by those skilled in the art that the systems and methods of the present invention may be implemented within a variety of server-client network architectures. In this regard, reference is now made to FIG. 15, which is a simplified block diagram of a sample server-client architecture for implementing multi-selection gifts, in accordance with an embodiment of the present invention. On the server side, the architecture in FIG. 15 includes application servers 1511-1514 managed by load balancers 1520, administration servers 1530, search servers 1540, and three databases. The databases include a transaction database for recording purchase and payment information 1551, including the data from e-gift database 470, a product database 1552 for storing product catalogue information, including the data from merchandise database 460 in FIG. 4, and a tracking database 1553 for tracking customer orders. Application server 1511 manages transaction database 1551, application server 1512 manages product database 1552, application server 1513 manages tracking database 1553, and application server 1554 manages search servers 1540. All of these server components are subsumed in e-commerce server computer 400.

Figure 15:
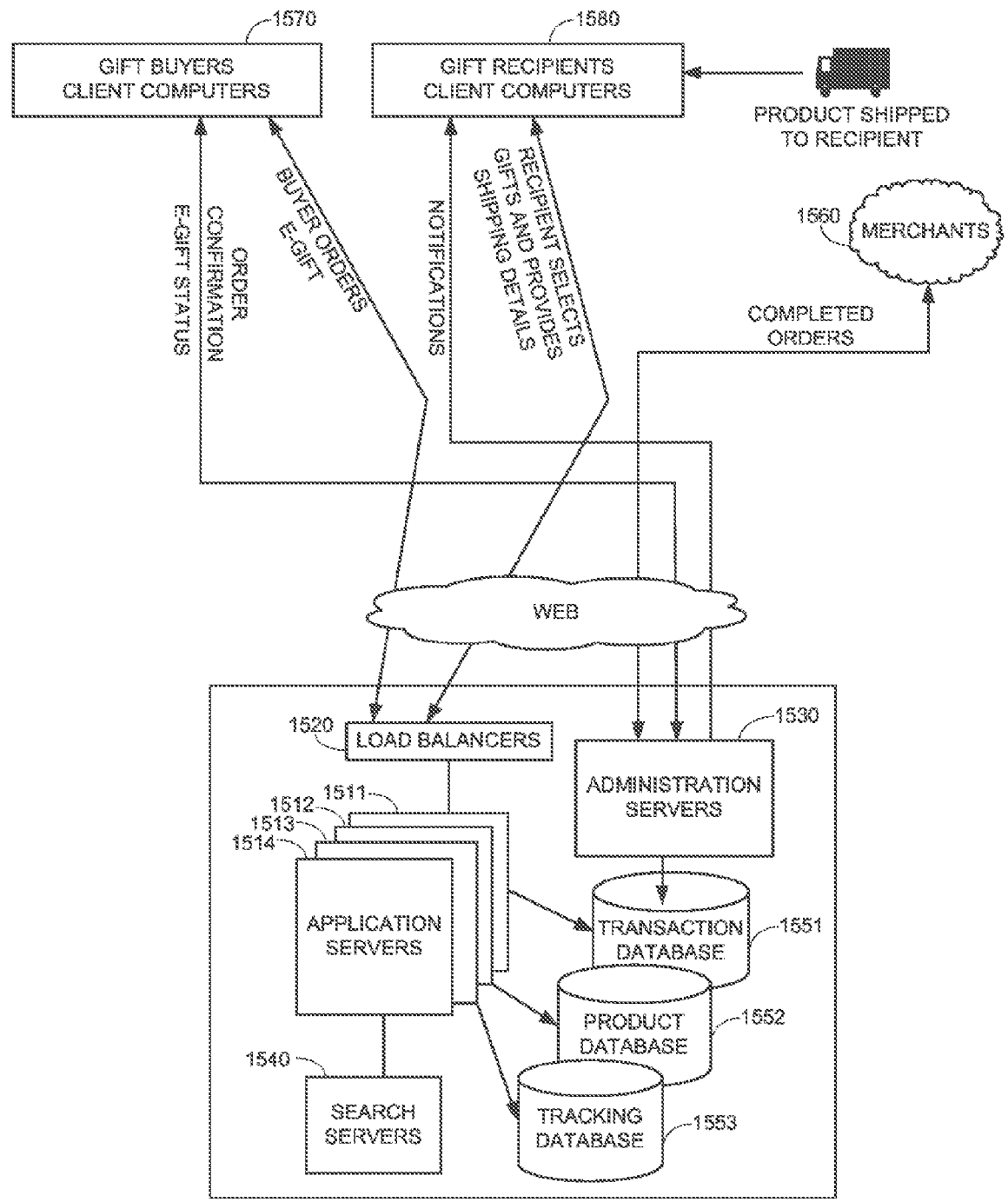
FIG. 15 is a simplified block diagram of a sample server-client architecture for implementing multi-selection gifts, in accordance with an embodiment of the present invention.

On the client side, the architecture in FIG. 15 includes merchant client computers 1560, including computers 410 from FIG. 4, gift giver client computers 1570, including computer 420, and gift recipient client computers 1580, including computer 430. Merchant client computers 1560 have two-way connections with administration servers 1530. Gift giver client computers 1570 have two-way connections with administration servers 1530 and with load balancers 1520. Gift recipient client computers 1580 have one-way connections with administration servers 1530 and two-way connections with load balancers 1520.

In reading the above description, persons skilled in the art will realize that there are many apparent variations that can be applied to the methods and systems described. In a very general setting, the multi-selection gift of the present invention corresponds to a set of gift choices $C=\{c_1, c_2, \ldots, c_n\}$, $n>1$, and the rules set by the gift giver correspond to at least one constraint of the form $f(S) \leq x$, where $f$ is a real-valued function of subsets $S \subset C$. To constrain the maximum number of gift choices that may be selected, the function $f(S)$ is defined as the number of gift choices in S. To constrain the total cost of the gift choices that may be selected, the function $f(S)$ is defined as the total cost of the gift choices in S. In these cases, the function $f$ is of the form $f(S)=\Sigma g(c): c \in S$) for a real-valued function g of choices $c \in C$. If $g(c)=1$ for all $c \in C$, then $f(S)$ is the number of choices in S. If $g(c)$=the price of choice c, then $f(S)$ is the total cost of the gift choices in S.

The function $f(S)$ is flexible, and may be defined so as to take into consideration price discounts when combinations of items are purchased from the same merchant, delivery expenses and taxes. In general, the only assumption that can be made about $f(S)$ is that $f$ is monotone increasing in the sense that $f(S_1) \leq f(S_2)$ whenever $S_1$ is a subset of $S_2$, $S_1 \subset S_2$.

Monotonicity enables a sequential selection algorithm, such as the algorithms of FIGS. 11-14 which sequentially process gift choices, to find subsets $S \subset C$ that satisfy the at least one constraint prescribed by the gift giver. Specifically, starting with the empty set $S=\emptyset$, corresponding to all gift choices being un-selected, the subset S is expanded by sequentially adding additional gift choices $c \in C$ to S one at a time, while counters are maintained of the constraint values $f(S)$ for the current subset S. As long as the constraint values $f(S)$ remain within the designated constraints, x, elements $c \in C$ may be added to S.

From the above general setting it will be appreciated by those skilled in the art that the present invention has widespread application to many diverse environments where a user has to select from among a list of choices, and where his selections are subject to prescribed constraints.

In the foregoing specification, the invention has been described and illustrated with reference to specific exemplary embodiments thereof. It will, however, be evident that the specific exemplary embodiments are not intended to be limiting, and various modifications and changes may be made to these embodiments without departing from the broader spirit and scope of the invention as set forth in the appended claims. Accordingly, the specification and drawings are to be regarded in an illustrative rather than a restrictive sense.

What is claimed is:

1. A computer processing-based method for multi-selection gifting, comprising:
    maintaining, by at least one of a plurality of computers, a gift database comprising records for multi-selection gifts, each record including a plurality of product identifiers for items of merchandise, and at least one selection rule governing selection of at least two of the items of merchandise; and
    interactively enabling, by at least one of the plurality of computers, a gift giver to generate a multi-selection gift for at least one gift recipient, comprising presenting, to the gift giver, a group of selection rules for selection by the gift giver, the group consisting of allowing a gift recipient to select up to a specified total number of items of merchandise in the multi-selection gift, allowing the gift recipient to select items of merchandise in the multi-selection gift up to a specified total cost, and at least one of: allowing the gift recipient to select all items of merchandise in the multi-selection gift, allowing the gift recipient to select only one item of merchandise in the multi-selection gift, or allowing the gift recipient to select a grouping of items of merchandise from multiple defined groups of items.

2. The method of claim 1 wherein said presenting enables the gift giver to designate a limit on the number of items of merchandise that the gift recipient may select.

3. The method of claim 1 wherein said presenting enables the gift giver to designate a limit on the total cost of the items of merchandise that the gift recipient may select.

4. The method of claim 1 wherein said presenting enables the gift giver to designate a limit on the total measure of the items of merchandise that the gift recipient may select.

5. The method of claim 1 wherein at least two items of merchandise are grouped together as a gift grouping, and wherein the at least one selection rule allows selection of a gift grouping as a single item of merchandise.

6. The method of claim 5 wherein the at least one selection rule enables the gift giver to designate whether or not the gift recipient can un-group a group of items of merchandise in a gift grouping into a plurality of individual items.

7. The method of claim 1 wherein each record includes a redemption status, indicating whether or not a multi-selection gift has been redeemed by a gift recipient, the method further comprising monitoring the redemption status of the multi-selection gift.

8. A system for multi-selection gifting, comprising:
    a memory for storing a gift database comprising records for multi-selection gifts, each record including a plurality of product identifiers for items of merchandise, and at least one selection rule governing selection of at least two of the items of merchandise; and
    a gift generator for enabling a gift giver to generate a multi-selection gift for at least one gift recipient, comprising a selection rule presenter for presenting, to the gift giver, a group of selection rules for selection by the gift giver, the group consisting of allowing a gift recipient to select up to a specified total number of items of merchandise in the multi-selection gift, allowing the gift recipient to select items of merchandise in the multi-selection gift up to a specified total cost, and at least one of: allowing the gift recipient to select all items of merchandise in the multi-selection gift, allowing the gift recipient to select only one item of merchandise in the multi-selection gift, or allowing the gift recipient to select a grouping of items of merchandise from multiple defined groups of items.

9. The system of claim 8 wherein each record includes a redemption status, indicating whether or not a multi-selection gift has been redeemed by a gift recipient, the system further comprising a gift monitor for monitoring the redemption status of the multi-selection gift generated by said gift generator.

10. The system of claim 8 further comprising a gift manager for enabling the gift giver to modify the multi-selection gift generated by said gift generator.

11. The system of claim 10 wherein said gift manager enables the gift giver to modify the plurality of product identifiers for items of merchandise in the multi-selection gift.

12. The system of claim 10 wherein said gift manager enables the gift giver to modify the at least one selection rule in the multi-selection gift.

13. The system of claim 8 further comprising a gift manager for cancelling the multi-selection gift generated by said gift generator.

14. The system of claim 8 wherein said gift generator enables the gift giver to designate the total number of items of merchandise that the gift recipient may select.

15. The system of claim 8 wherein said gift generator enables the gift giver to designate the total cost of items of merchandise that the gift recipient may select.

16. The system of claim 8 wherein said gift generator enables the gift giver to designate the total measure of items of merchandise that the gift recipient may select.

17. The system of claim 8 wherein at least two items of merchandise are grouped together as a gift grouping, and wherein the at least one selection rule allows selection of a gift grouping as a single item of merchandise.

18. The system of claim 17 wherein the at least one selection rule enables the gift giver to designate whether or not the gift recipient can un-group a group of items of merchandise in a gift grouping into a plurality of individual items.

19. A non-transitory computer-readable storage medium storing program code for causing a computing device:

to maintain a gift database comprising records for multi-selection gifts, each record including a plurality of product identifiers for items of merchandise, and at least one selection rule governing selection of at least two of the items of merchandise; and to interactively enable a gift giver to generate a multi-selection gift for at least one gift recipient, by presenting, to the gift giver, a group of selection rules for selection by the gift giver, the group consisting of allowing a gift recipient to select up to a specified total number of items of merchandise in the multi-selection gift, allowing the gift recipient to select items of merchandise in the multi-selection gift up to a specified total cost, and at least one of: allowing the gift recipient to select all items of merchandise in the multi-selection gift, allowing the gift recipient to select only one item of merchandise in the multi-selection gift, or allowing the gift recipient to select a grouping of items of merchandise from multiple defined groups of items.

\* \* \* \* \*